(12) United States Patent
Higuchi

(10) Patent No.: US 10,282,343 B2
(45) Date of Patent: May 7, 2019

(54) SEMICONDUCTOR DEVICE

(71) Applicant: Renesas Electronics Corporation, Tokyo (JP)

(72) Inventor: Takashi Higuchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 552 days.

(21) Appl. No.: 15/008,350

(22) Filed: Jan. 27, 2016

(65) Prior Publication Data

US 2016/0292123 A1    Oct. 6, 2016

(30) Foreign Application Priority Data

Mar. 30, 2015  (JP) ................................. 2015-068587

(51) Int. Cl.
   *G06F 13/40*   (2006.01)
   *G06F 13/42*   (2006.01)
   *G06F 13/364*  (2006.01)

(52) U.S. Cl.
   CPC ........ *G06F 13/4282* (2013.01); *G06F 13/364* (2013.01); *G06F 13/404* (2013.01); *G06F 13/4018* (2013.01)

(58) Field of Classification Search
   CPC . G06F 13/4018; G06F 13/404; G06F 13/4282
   See application file for complete search history.

(56) References Cited

U.S. PATENT DOCUMENTS

| 5,936,953 A | 8/1999 | Simmons |
| 7,543,088 B2 * | 6/2009 | Weber ................. G06F 13/4018 710/110 |
| 8,032,676 B2 * | 10/2011 | Wingard ............ H04L 49/3054 370/229 |
| 8,190,801 B2 * | 5/2012 | Harris ................. G06F 13/4027 710/113 |

(Continued)

FOREIGN PATENT DOCUMENTS

| GB | 2 426 604 A | 11/2006 |
| JP | 2003-296267 A | 10/2003 |

(Continued)

OTHER PUBLICATIONS

Extended European Search Report dated Jul. 20, 2016.

(Continued)

*Primary Examiner* — Steven G Snyder
*Assistant Examiner* — Christopher A. Daley
(74) *Attorney, Agent, or Firm* — McGinn IP Law Group, PLLC

(57) ABSTRACT

The disclosed invention improves the transfer efficiency of a bus transfer device. A semiconductor device includes a bus transfer device including a read data transfer path which can transfer read data having an n-bit width at a maximum. If first read data and second read data corresponding respectively to a first transaction and a second transaction have a total bit width of n bits or less, the bus transfer device can simultaneously transfer data obtained by unifying the first read data and the second read data, first transaction identi- (Continued)

fication information, and second transaction identification information through the read data transfer path.

21 Claims, 13 Drawing Sheets

(56) References Cited

U.S. PATENT DOCUMENTS

| | | | |
|---|---|---|---|
| 9,021,169 B2* | 4/2015 | Lee | G06F 13/14 710/110 |
| 9,645,957 B2 | 5/2017 | Tanaka et al. | |
| 2003/0191884 A1* | 10/2003 | Anjo | G06F 13/364 710/307 |
| 2013/0346653 A1 | 12/2013 | Freking et al. | |
| 2014/0365705 A1* | 12/2014 | Tanaka | G06F 13/362 710/308 |

FOREIGN PATENT DOCUMENTS

| | | |
|---|---|---|
| JP | 2006-331426 A | 12/2006 |
| JP | 2014-238769 A | 12/2014 |

OTHER PUBLICATIONS

European Communication pursuant to Article 94(3) EPC dated Sep. 26, 2017 in European Application No. 16 162 723.7.
Japanese Office Action dated Aug. 28, 2018, with an English translation.

* cited by examiner

SEMICONDUCTOR DEVICE

CROSS-REFERENCE TO RELATED APPLICATIONS

The disclosure of Japanese Patent Application No. 2015-068587 filed on Mar. 30, 2015 including the specification, drawings and abstract is incorporated herein by reference in its entirety.

BACKGROUND

The present invention relates to a semiconductor device, and is particularly suited to bus transfer between logic units of a semiconductor device.

There has been known AMBA (registered trademark) (Advanced Microcontroller Bus Architecture) as an on-chip bus standard for system LSI (Large Scale Integration) developed by ARM (registered trademark) Limited in UK. In AMBA (registered trademark) 3.0, an AXI (Advance eXtensible Interface) protocol for high-performance system LSI is added. In the AXI protocol, a split transaction in which an address and data can be transferred independently of each other is adopted.

Japanese Unexamined Patent Publication No. 2006-331426 (Patent Document 1) discloses a bus transfer device which uses a split transaction protocol and can transfer data in an out-of-order manner.

SUMMARY

The present inventors have verified the function of the bus transfer device in the related art and found the following problem. That is, in the bus transfer device in the related art, burst transfer of data to/from a memory or the like uses the whole bus width, with high occupancy of the bus. On the other hand, data of a small bit width does not use the whole bus width. In such transfer data of a small bit width, even if the bus width is expanded, the bus width used for data transfer does not change; therefore, the transfer efficiency does not increase.

The other problems and novel features will become apparent from the description of this specification and the accompanying drawings.

A semiconductor device according to one embodiment includes a bus transfer device including a read data transfer path which can transfer read data having an n-bit width at a maximum. If first read data and second read data corresponding respectively to a first transaction and a second transaction have a total bit width of n bits or less, the bus transfer device can simultaneously transfer data obtained by unifying the first read data and the second read data, first transaction identification information, and second transaction identification information through the read data transfer path.

According to the above embodiment, it is possible to improve the transfer efficiency of the bus transfer device.

DETAILED DESCRIPTION

Figure 1:
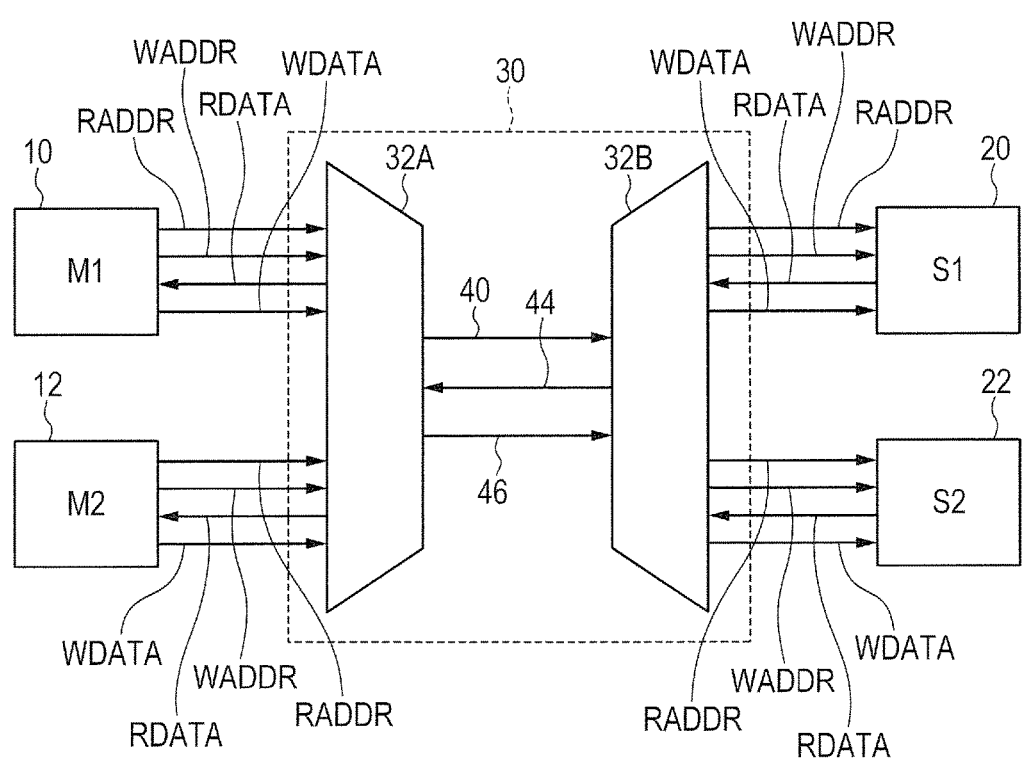
FIG. 1 is a block diagram showing the overall configuration of a semiconductor device.

Hereinafter, various embodiments will be described in detail with reference to the drawings. The same or equivalent sections are denoted by the same reference numerals, and their description will not be repeated.

<Overall Configuration of Semiconductor Device>

FIG. 1 is a block diagram showing the overall configuration of a semiconductor device. Referring to FIG. 1, the semiconductor device includes bus masters (M1, M2) 10, 12, bus slaves (S1, S2) 20, 22, and a bus transfer device 30 for coupling the bus masters 10, 12 and the bus slaves 20, 22.

Examples of the bus masters (M1, M2) 10, 12 include a CPU (Central Processing Unit) and a DMA (Direct Memory Access) controller. Examples of the bus slaves (S1, S2) 20, 22 include a peripheral I/O (Input/Output) device and a memory device. Some peripheral I/O devices function as the bus master by incorporating the DMA controller.

The bus transfer device 30 includes an address transfer path 40 for transferring an address, a read data transfer path 44 for transferring read data, and a write data transfer path 46 for transferring write data. A read address RADDR and a write address WADDR (each of which is occasionally abbreviated as an address ADDR) are transferred from the bus masters M1, M2 toward the bus slaves S1, S2 over the address transfer path 40. Read data RDATA is transferred from the bus slaves S1, S2 toward the bus masters M1, M2 over the read data transfer path 44. Write data WDATA is transferred from the bus masters M1, M2 toward the bus slaves S1, S2 over the write data transfer path 46.

In the bus transfer device 30, address transfer and data transfer in one transaction can be performed independently of each other (i.e., in the bus transfer device 30, the split transaction is adopted). As described later in detail, to implement the split transaction, the read address RADDR, the write address WADDR, the read data RDATA, and the write data WDATA are assigned identification data (ID) to identify which bus master has issued which transaction.

In this specification, the address transfer path 40, the read data transfer path 44, and the write data transfer path 46 are also referred to as an address bus, a read data bus, and a write data bus, respectively. In the AXI protocol, the terms "address channel", "read data channel", and "write data channel" are used to be distinguished from the address bus, the read data bus, and the write data bus according to the conventional AHB (Advanced High-performance Bus) protocol. However, in this specification, for simplicity, the term "bus" is used instead of "channel", even in accordance with the AXI protocol.

The bus transfer device 30 further includes a bus control unit 32 (32A, 32B) for controlling the transfer of the read address RADDR, the write address WADDR, the read data RDATA, and the write data WDATA. As shown in FIG. 1, in the case of distinguishing between the master side and the slave side, the bus control unit is written as the bus control unit 32A and the bus control unit 32B. Hereinafter, the configuration and operation of the bus control unit 32 according to each embodiment will be described in detail.

First Embodiment

Figure 2:
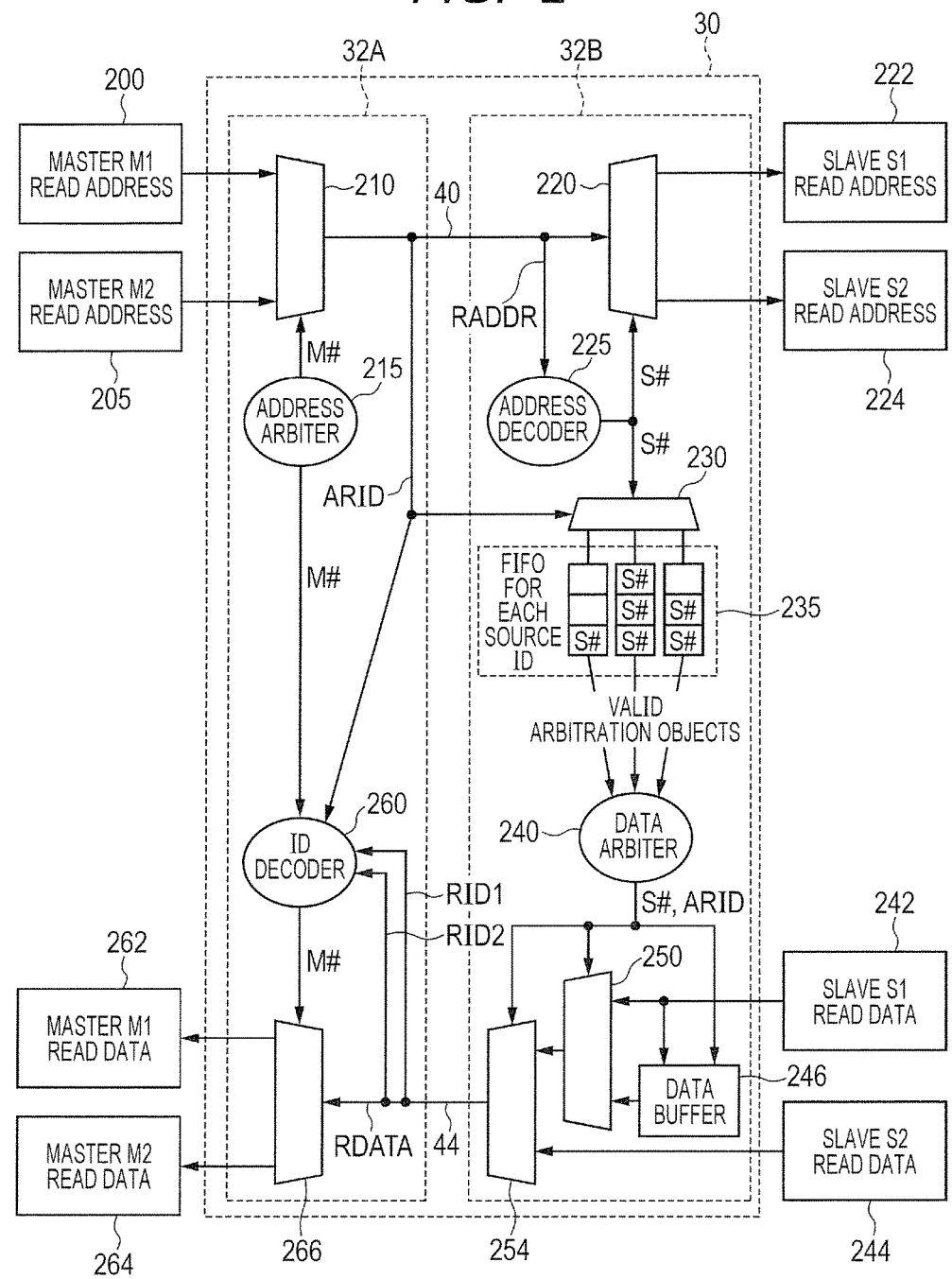
FIG. 2 is a block diagram showing the detailed configuration of a part related to read address transfer and read data transfer in a bus transfer device of FIG. 1.

FIG. 2 is a block diagram showing the detailed configuration of a part related to read address transfer and read data transfer in the bus transfer device of FIG. 1. Referring to FIG. 2, the bus control unit 32 includes an address arbiter 215, an address decoder 225, a state logic circuit 235, a data arbiter 240, an ID decoder 260, a data buffer 246, multiplexers 210, 250, 254, and demultiplexers 220, 230, 266.

[Transfer of Read Address]

First, the transfer of the read address will be described. As shown in FIG. 2, the bus master M1 issues a read address 200, and the bus master M2 issues a read address 205. An address selection circuit (multiplexer) 210 receives the read addresses 200, 205 from the two different bus masters M1, M2, respectively. The address arbiter 215 controls the multiplexer 210 to perform arbitration between a plurality of read addresses requiring the use of the address bus.

Further, the address selection circuit 210 generates an ID value (ARID) for identifying the source of each received read address (i.e., which bus master has issued which read transaction). The address selection circuit 210 adds the generated ID value (ARID) to the read address (RADDR) corresponding to the ID value, and outputs the ID value along with the read address to the address transfer path 40.

Each read address (RADDR) and ID value (ARID) is sent through the address transfer path 40 to an address distribution circuit (demultiplexer) 220. In FIG. 2, "ARID" is shown to emphasize the ID value that is associated with the read address. In the case of the same transaction issued by the same master, the ID value (ARID) associated with the read address is identical to an ID value (RID) associated with the read data corresponding to the read address.

The address distribution circuit 220 is controlled by output from the address decoder 225. More specifically, the address decoder 225 decodes the read address RADDR and thereby determines which bus slave is a target bus slave corresponding to the read address. Then, the address decoder 225 outputs a slave number S# to the demultiplexer 220. The demultiplexer 220 outputs the read address and the corresponding ID value as a read address 222 for the slave S1 or a read address 224 for the slave S2 to the required target bus slave, in accordance with the slave number S#.

The information of the slave number S# is also inputted along with the information of the corresponding ID value (ARID) to a slave number distribution circuit (demultiplexer) 230. The slave number distribution circuit 230 distributes the inputted slave number S# for each ID value (ARID).

It can be conceptually considered that in the state logic circuit 235, a first-in first-out (FIFO) buffer for storing the information of the slave number S# is provided for each source ID. The demultiplexer 230 sends the slave number S# received from the address decoder 225 to an appropriate FIFO buffer in the state logic circuit 235, based on the received ID value (ARID). The information of the slave number S# is held in the state logic circuit 235 until selected as an arbitration result by the data arbiter 240.

In reality, the state logic circuit 235 does not need to be configured as a plurality of FIFO buffers provided individually for each ID value. The state logic circuit 235 can be configured in such a way that a plurality of read data inputs having the same ID value are associated with the order of read address outputs (i.e., in such a way that a plurality of read data corresponding to addresses having the same ID value can be returned in the order in which the addresses have been issued).

[Arbitration by Data Arbiter]

By referring to the state logic circuit 235, the data arbiter 240 sequentially selects read data to be transferred through the read data bus 44. The first slave number S# of each FIFO buffer is a valid arbitration object by the data arbiter 240. That is, only one slave number S# of each ID value is a valid arbitration object. This is due to the constraint that a plurality of read data having the same ID value must be returned in the order in which the corresponding addresses have been issued.

Accordingly, if there is only one valid arbitration object in the state logic circuit 235, the data arbiter 240 extracts the slave number S# corresponding to the valid arbitration object from the FIFO buffer, and informs the slave number S# along with the corresponding ID value (ARID) to data selection circuits (multiplexers) 250, 254, and the data buffer 246. If there are a plurality of valid arbitration objects, the data arbiter 240 determines the slave number S# of the output source of read data to be transferred next in accordance with a predetermined arbitration guideline (priority order), extracts the determined slave number S# from the FIFO buffer, and informs the slave number S# along with the corresponding ID value (ARID) to the data selection circuits (multiplexers) 250, 254, and the data buffer 246. The data arbiter 240 can assign priorities to the valid arbitration objects, based on the master, the slave, the ID value, or any combination thereof.

[Transfer of Read Data]

Next, the transfer of the read data will be described. The read data transfer path 44 shown in FIG. 2 can transfer data having a maximum bit width of n bits. Further, the read data transfer path 44 can transfer, along with the read data, a plurality of ID values (two ID values (RID1, RID2) in FIG. 2) for identifying the read data RDATA. For example, in the case where it is possible to transfer two m-bit ID values, the number of signal lines necessary for the read data transfer path 44 is n+2×m.

Hereinafter, read data 242 read from the bus slave S1 has a data width of n/2 bits or less (if the data width of the read data 242 is variable, the data width might be equal to n bits). Read data 244 read from the bus slave S2 has a data width of n bits. In the case of a burst mode, n-bit wide data is repeatedly outputted multiple times from the bus slave S2. Further, the bus slaves S1, S2 output associated information such as the ID value, besides the read data.

More specifically, the bus slave S1 outputs the read data 242, the ID value (RID) corresponding to the read data 242, and the information of a position that the read data occupies in n-bit data lines configuring the read data transfer path 44. For example, if the number n of bits of the data lines is 128 and the bit width of the data outputted from the bus slave S1 is 32 bits (fixed), the position information contains four positions which are the 1st to 32nd bits, the 33rd to 64th bits, the 65th to 96th bits, and the 97th to 128th bits. The bus slave S1 can automatically determine the information of the position which the read data uses, in association with the read address for storing the read data. If the data width of the read data 242 outputted from the bus slave S1 is variable, the information of a data size is also outputted from the bus slave S1.

The bus slave S2 outputs the read data 244 and the ID value (RID) corresponding to the read data 244. Since the data width outputted from the bus slave S2 is n bits and equal to the number of bits of the data lines of the read data transfer path 44, the position information is not necessary.

The data arbiter 240 informs the slave number S# as an arbitration result and the corresponding ID value (ARID) to the data selection circuits (multiplexers) 250, 254, and the data buffer 246.

The data buffer 246 is used to temporarily hold the read data 242 and the associated information (the ID value, the position information of the data in the read data bus width) outputted from the slave S1. More specifically, the data buffer 246 is used if the read data 242 outputted from the slave S1 cannot be transferred to the read data transfer path 44 (i.e., when the read data transfer path 44 is being used by the other slave) and the data width of the read data 242 is less than n bits.

In accordance with the arbitration result of the data arbiter 240, the data selection circuit (multiplexer) 250 outputs either the read data 242 outputted from the slave S1 or the read data held in the data buffer 246, or selects and simultaneously outputs both of them. Conditions for simultaneously outputting two pieces of read data will be described later. When the read data is outputted from the multiplexer (the data selection circuit 250), the corresponding ID value (RID) is also outputted. Therefore, when both the read data 242 outputted from the slave S1 and the read data held in the data buffer 246 are simultaneously outputted, the corresponding two ID values (RID1, RID2) are also outputted.

In accordance with the arbitration result (the slave number S#, the ID value (ARID)) informed from the data arbiter 240, the data selection circuit (multiplexer) 254 selects either the output result of the multiplexer (data selection circuit) 250 (if the number of the slave S1 is informed) or the read data 244 from the bus slave S2. The multiplexer (data selection circuit) 254 outputs the selected read data and the ID value corresponding to the read data to the read data transfer path 44.

The ID value (RID1, RID2) transferred through the read data transfer path 44 is inputted to the ID decoder 260, and the read data RDATA transferred through the read data transfer path 44 is inputted to the data distribution circuit (demultiplexer) 266.

The ID decoder 260 decodes the ID value (RID1, RID2) transferred through the read data transfer path 44 and thereby extracts the information of the master number M# indicated by the ID value. In FIG. 2, the ID decoder 260 acquires the correspondence relationship between the ID value (ARID) and the master number M# beforehand, and thereby can easily decode the ID value. The ID decoder 260 informs the information of the master number M# indicated by the ID value to the data distribution circuit (demultiplexer) 266.

In accordance with the master number M# informed from the ID decoder 260, the data distribution circuit (demultiplexer) 266 distributes the read data RDATA received through the read data transfer path 44, as read data 262 to the bus master M1 or read data 264 to the bus master M2. If both the read data 242 outputted from the slave S1 and the read data held in the data buffer 246 are simultaneously outputted, the demultiplexer 266 outputs each read data to the master of the issue source of the ID value, in accordance with the master number M# corresponding to the ID value (RID1, RID2).

[Conditions for Simultaneously Outputting Two Pieces of Read Data]

Hereinafter, conditions for simultaneously outputting two pieces of read data from the data selection circuit 250 will be described. Based on the ID value of the read data 242 outputted from the slave S1 and the data position information (and also the data size information if the data size is variable), the data selection circuit 250 determines that it is possible to simultaneously output the read data held in the data buffer 246 and the read data 242 outputted from the slave S1 if all the following conditions are satisfied.

(Condition R1) The ID value of the read data held in the data buffer 246 matches the ID value of the first priority indicated as the arbitration result by the data arbiter 240, and the ID value of the read data 242 outputted from the slave S1 matches the ID value of the second priority. That is, the data arbiter 240 indicates the output of the read data currently held in the data buffer 246 as the previous arbitration result, and indicates the output of the read data 242 from the slave S1 as the current arbitration result.

(Condition R2) The master of the transfer destination of the read data held in the data buffer 246 differs from the master of the transfer destination of the read data 242 outputted from the slave S1. The ID value (RID) has the information of the master of the transfer destination (i.e., the master of the issue source of the transaction).

(Condition R3) A data position on the transfer path 44 used by the read data 242 outputted from the slave S1 does not overlap with a data position on the transfer path 44 used by the read data held in the data buffer 246.

[Specific Example of Read Data Transfer]

Figure 3:
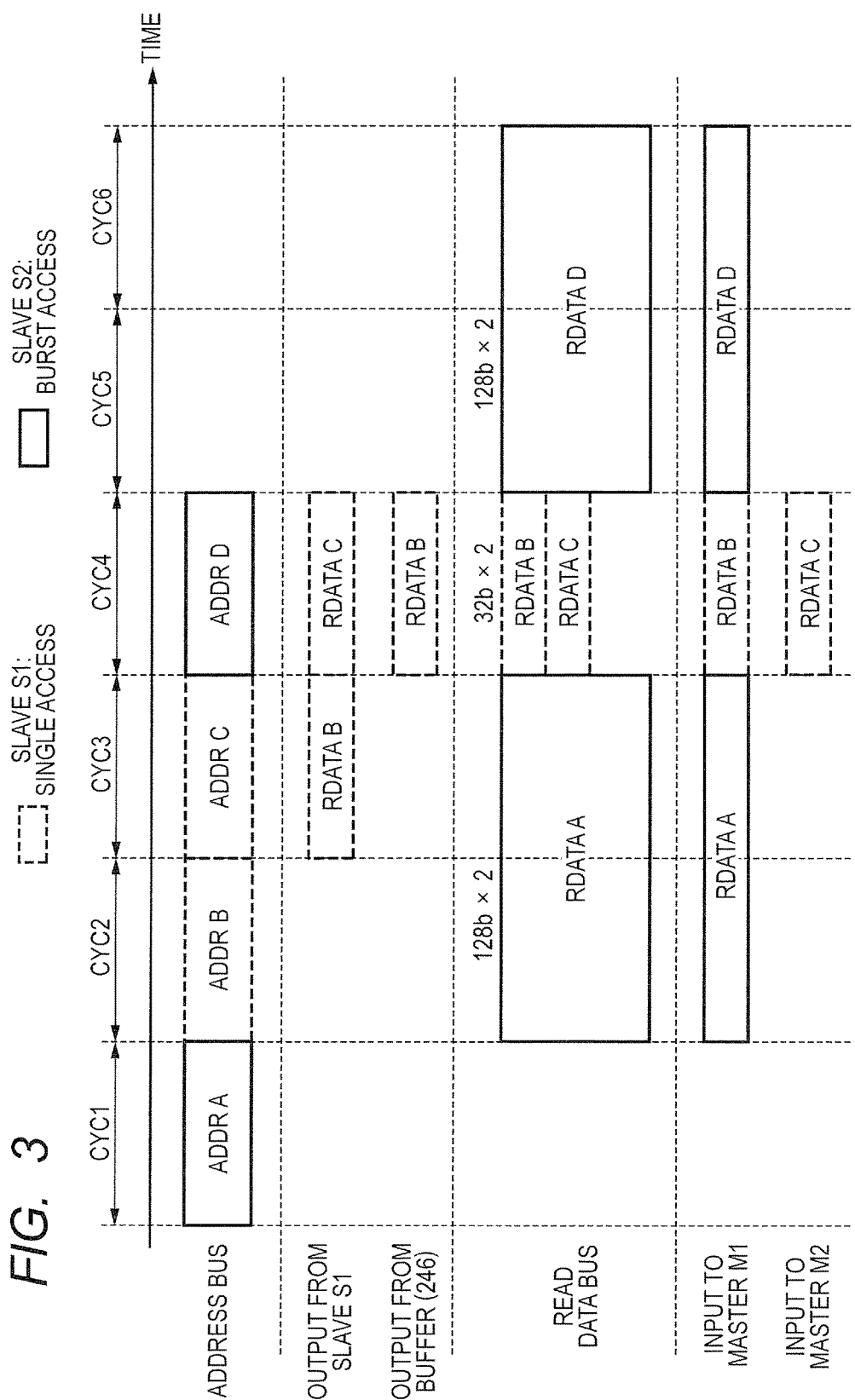
FIG. 3 is a timing chart showing a specific example of read data transfer by the bus transfer device of FIG. 2.

FIG. 3 is a timing chart showing a specific example of read data transfer by the bus transfer device 30 of FIG. 2. FIG. 3 shows, in order from the top, read addresses being transferred on the address bus, read data outputted from the slave S1, output data from the data buffer 246, read data being transferred on the read data bus, input data to the master M1, and input data to the master M2. In FIG. 3, the horizontal axis represents the time, containing six periods from a first period CYC1 to a sixth period CYC6 of a clock signal. In reality, at the beginning of each period, the signal changes and is not fixed; however, in FIG. 3, for the sake of brevity, the signal is written as if it was fixed. The same applies to the other timing charts in this specification.

Referring to FIGS. 2 and 3, in the first period CYC1, the master M1 issues an instruction for burst transfer of a data group beginning with a start address ADDR A to the slave S2. The address selection circuit 210 generates an ID value (ARID="1") for identifying the master M1 and the transaction. The information of the start address ADDR A is transferred along with the ID value through the address transfer path 40 to the slave S2. The slave number "2" obtained by decoding the address ADDR A and the information of the ID value "1" are informed to the data arbiter 240. In the following periods CYC2, CYC3, in accordance with the control of the data arbiter 240, 128-bit wide data is transferred from the slave S2 through the read data transfer path 44 to the master M1.

In the second period CYC2, the master M1 issues an instruction (single access) for transfer of data stored in an address ADDR B to the slave S1. The address selection circuit 210 generates an ID value (ARID="2") for identifying the master M1 and the transaction. The information of the address ADDR B is transferred along with the ID value through the address transfer path 40 to the slave S1. The slave number "1" obtained by decoding the address ADDR B and the information of the ID value "2" are informed to the data arbiter 240. In the next period CYC3, the read data 244 from the slave S2 selected by the data selection circuit 254 is being transferred. Further, read data is not held in the data buffer 246, and the data width (32 bits) of read data RDATA B outputted from the slave S1 is less than the data width (n=128 bits) of the read data transfer path 44. Consequently, in the third period CYC3, the read data RDATA B outputted from the slave S1 and the associated information (the ID value "2" etc.) are held in the data buffer 246.

Further, in the third period CYC3, the master M2 issues an instruction (single access) for transfer of data stored in an address ADDR C to the slave S1. The address selection circuit 210 generates an ID value (ARID="3") for identifying the master M2 and the transaction. The information of the address ADDR C is transferred along with the ID value through the address transfer path 40 to the slave S1. The slave number "1" obtained by decoding the address ADDR C and the information of the ID value "3" are informed to the data arbiter 240.

In the next period CYC4, read data RDATA C and the associated information (the ID value "3" etc.) are outputted from the slave S1. Further, the read data RDATA B and the associated information (the ID value "2" etc.) are outputted from the data buffer 246. Assume that the bit position of the read data RDATA B is the 1st to 32nd bits, the bit position of the read data RDATA C is the 33rd to 64th bits, and there is no overlap between the two. Accordingly, the data selection circuit 250 determines and informs to the data selection circuit 254 that it is possible to unify and output the read data RDATA C outputted from the slave S1 and the read data RDATA B outputted from the data buffer 246. The data selection circuit 254 outputs the unified read data (RDATA B, RDATA C) having a data width of 64 bits, the ID value "2" corresponding to the read data RDATA B, and the ID value "3" corresponding to the read data RDATA C to the read data transfer path 44. The ID value "2" and the ID value "3" are transferred to the ID decoder 260. The ID decoder 260 informs the master numbers M# corresponding respectively to the ID value "2" and the ID value "3" to the data distribution circuit 266. The data distribution circuit 266 inputs the read data (RDATA B) 262 to the master M1 and inputs the read data (RDATA C) 264 to the master M2, in accordance with the informed master numbers M#.

Further, in the fourth period CYC4, the master M1 issues an instruction for burst transfer of a data group beginning with a start address ADDR D to the slave S2. The address selection circuit 210 generates an ID value (ARID="1") for identifying the master M1 and the transaction. The information of the start address ADDR D is transferred along with the ID value through the address transfer path 40 to the slave S2. The slave number "2" obtained by decoding the address ADDR D and the information of the ID value "1" are informed to the data arbiter 240. In the following periods CYC5, CYC6, in accordance with the control of the data arbiter 240, 128-bit wide data is transferred from the slave S2 through the read data transfer path 44 to the master M1.

Effect of First Embodiment

The above-described bus transfer device 30 can transfer, on the read data bus having a bus width of n bits, two pieces of read data whose total data width is less than the bus width. In this case, two transaction ID values corresponding respectively to the two pieces of read data are also simultaneously transferred. Consequently, it is possible to enhance the transfer speed of data less than the maximum bus width, which can increase a response speed in read access from the bus master to the bus slave.

[Modification]

In FIG. 2, two bus masters, two bus slaves, and three possible ID values in the state logic circuit 235 are illustrated. However, the invention is not limited to such a configuration, and the above technique is also applicable to a larger number of bus masters, a larger number of bus slaves, and a larger number of ID values.

Further, while the example of unifying and transferring two pieces of read data has been shown, it is possible in principle to unify and transfer more read data within the bus width n of the read data transfer path. In this case, it is necessary to have data buffers according to the number of data to be unified and simultaneously transfer ID values corresponding respectively to the read data to be unified.

Second Embodiment

In the first embodiment, the unification and bus transfer of a plurality of read data having the transfer destinations of different bus masters has been described. In the second embodiment, the unification and bus transfer of a plurality of read data having the transfer destination of the same bus master will be described. In this case, the condition R2 is not necessary, and the data selection circuit 250 determines that it is possible to simultaneously output the read data held in the data buffer 246 and the read data 242 outputted from the slave S1 if the conditions R1 and R3 are satisfied. Hereinafter, a detailed description will be made with reference to the drawings.

[Configuration of Bus Transfer Device]

Figure 4:
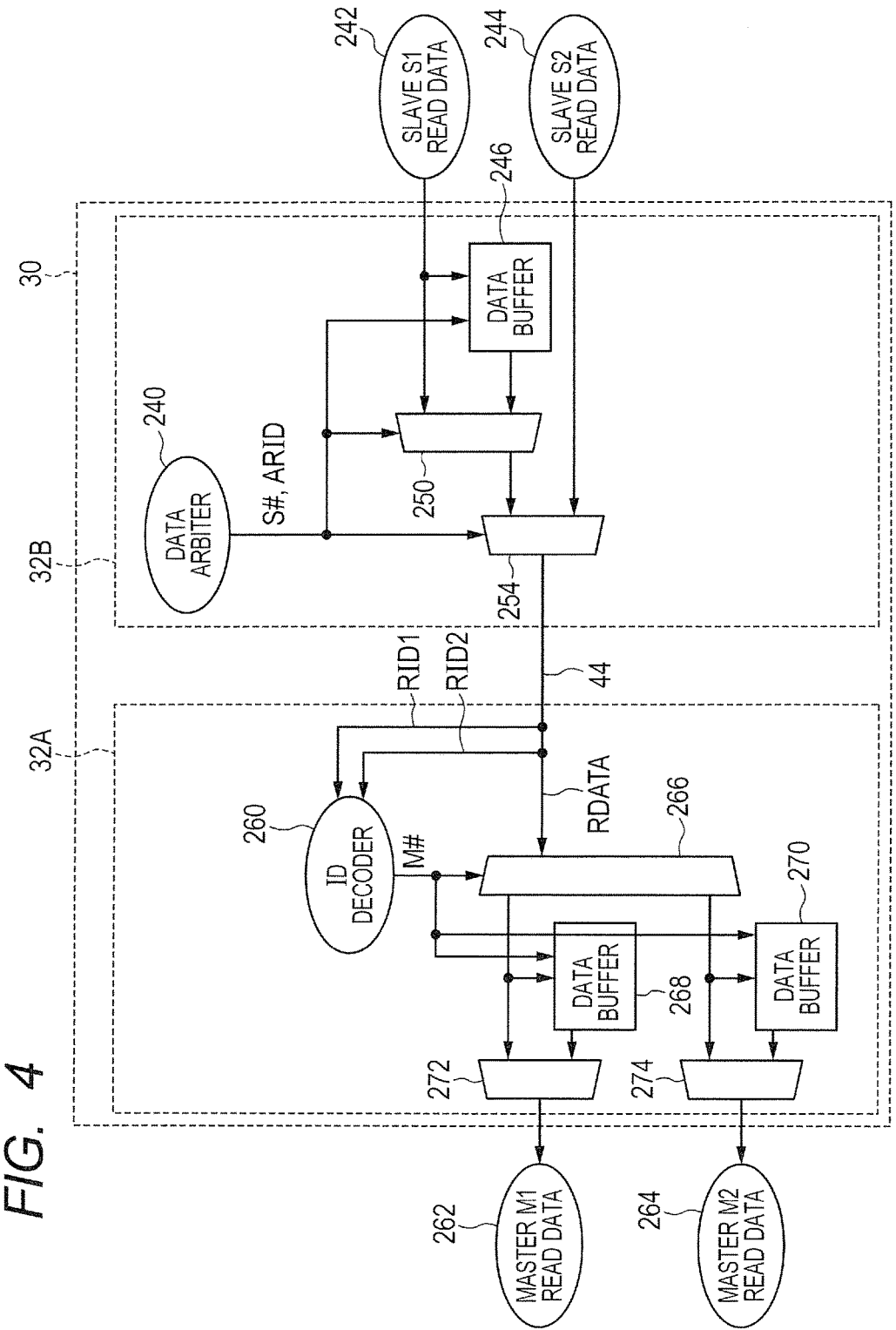
FIG. 4 is a block diagram showing a partial configuration of a bus transfer device according to a second embodiment.

FIG. 4 is a block diagram showing a partial configuration of a bus transfer device according to the second embodiment. FIG. 4 shows only a part related to the read data bus in the bus transfer device of FIG. 2. The configuration of a part related to the address bus is the same as in FIG. 2. As shown in FIG. 4, the bus transfer device 30 differs from that of FIG. 2 in that the bus control unit 32A of the bus transfer device 30 further includes data buffers 268, 270 and multiplexers (data selection circuits) 272, 274. Since the rest of FIG. 4 is the same as in FIG. 2, the same or equivalent sections are denoted by the same reference numerals, and their description will not be repeated.

The second embodiment is characterized in that it is possible to unify two pieces of read data having the transfer destination of the same bus master (the condition R2 is not necessary). In this case, the read data of higher priority is immediately inputted to the bus master of the transfer destination, whereas the read data of lower priority is temporarily held in the data buffer 268 or 270. The read data of lower priority is inputted to the bus master of the transfer destination from the data buffer after the read data of higher priority is inputted. Thus, the two pieces of read data are inputted to the same bus master in order of priority determined by the data arbiter 240.

More specifically, if both the conditions R1 and R3 are satisfied (the condition R2 is not necessary), the data selection circuit 250 unifies the read data held in the data buffer 246 and the read data 242 outputted from the slave S1. The unified read data RDATA and the corresponding two ID values (RID1, RID2) are simultaneously outputted to the read data transfer path 44. Assume that the two ID values (RID1, RID2) indicate the same bus master.

If the bus masters of transfer destinations indicated by the two ID values (RID1, RID2) transferred through the read data transfer path 44 are the same, the ID decoder 260 informs the simultaneous transfer of data to the data buffer, corresponding to the appropriate master, of the data buffers 268, 270. In accordance with the control of the ID decoder 260, the data distribution circuit 266 inputs a part, corresponding to the read data held in the data buffer 246, of the transferred unified read data to the appropriate master, and stores the remaining part in the corresponding data buffer 268 or 270. That is, the read data first outputted from the slave S1 is inputted to the appropriate master, and the read data next outputted from the slave S1 is inputted to the corresponding data buffer. In the next period, the read data stored in the data buffer 268 or 270 is inputted to the appropriate master.

[Specific Example of Read Data Transfer]

Figure 5:
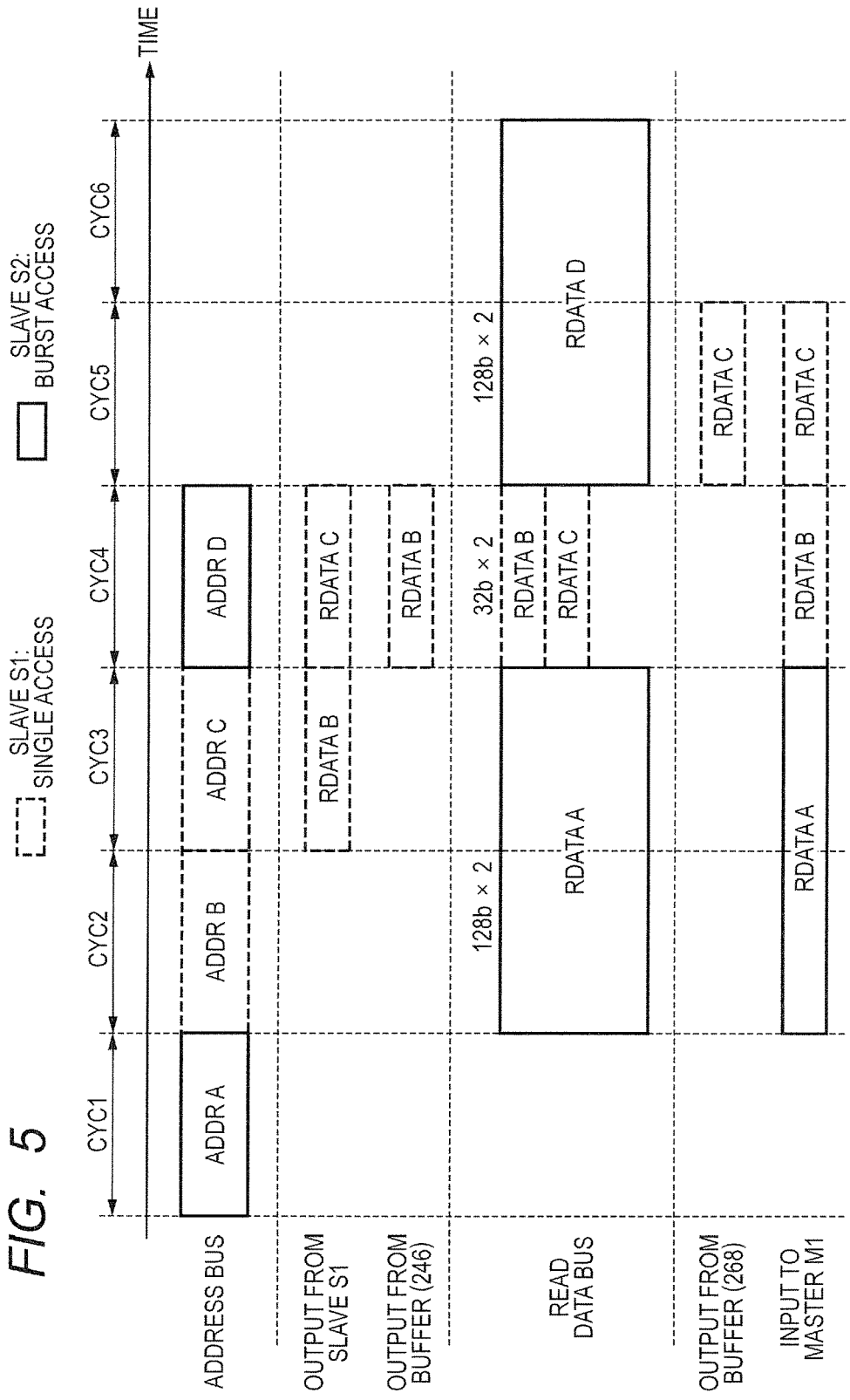
FIG. 5 is a timing chart showing a specific example of read data transfer by the bus transfer device of FIG. 4.

FIG. 5 is a timing chart showing a specific example of read data transfer by the bus transfer device 30 of FIG. 4. FIG. 5 shows, in order from the top, read addresses being transferred on the address bus, read data outputted from the slave S1, output data from the data buffer 246, read data being transferred on the read data bus, output data from the data buffer 268, and input data to the master M1. In FIG. 5, the horizontal axis represents the time, containing six periods from a first period CYC1 to a sixth period CYC6 of a clock signal.

Referring to FIGS. 4 and 5, the first period CYC1 to the third period CYC3 in FIG. 5 are approximately the same as in FIG. 3 of the first embodiment. The difference is the master number that issues an instruction (single access) for transfer of data stored in the address ADDR C to the slave S1 in the third period.

More specifically, in FIG. 3 the master M2 issues the instruction for transfer of data stored in the address ADDR C to the slave S1, whereas in FIG. 5 the master M1 issues the instruction for transfer of data stored in the address ADDR C to the slave S1. That is, the read address ADDR B issued in the second period CYC2 and the read address ADDR C issued in the third period CYC3 correspond to different transactions B (having ID values "2" and "3" respectively) issued from the same master M1.

In the next period CYC4, read data RDATA C and the associated information (the ID value "3" etc.) are outputted from the slave S1. Further, the read data RDATA B and the associated information (the ID value "2" etc.) are outputted from the data buffer 246. Assume that the bit position of the read data RDATA B is the 1st to 32nd bits, the bit position of the read data RDATA C is the 33rd to 64th bits, and there is no overlap between the two. Accordingly, the data selection circuit 250 determines and informs to the data selection circuit 254 that it is possible to unify and output the read data RDATA C outputted from the slave S1 and the read data RDATA B outputted from the data buffer 246. The data selection circuit 254 outputs the unified read data (RDATA B, RDATA C) having a data width of 64 bits, the ID value "2" corresponding to the read data RDATA B, and the ID value "3" corresponding to the read data RDATA C to the read data transfer path 44.

The two ID values "2" and "3" are transferred to the ID decoder 260. The ID decoder 260 decodes the two transferred ID values and thereby detects that the master number "1" corresponding to the ID value "2" and the master number "1" corresponding to the ID value "3" are the same. The ID decoder 260 informs information that the two pieces of read data having the destination of the master M1 are simultaneously transferred, to the data distribution circuit 266 and the data buffer 268. In accordance with the control of the ID decoder 260, the data distribution circuit 266 inputs the read data RDATA B held in the data buffer 246 which is a part of the transferred read data to the appropriate master M1, and stores the read data RDATA C which is the remaining part into the data buffer 268. In the next period CYC5, the read data RDATA C stored in the data buffer 268 is inputted to the master M1.

Further, in the fourth period CYC4, the master M2 issues an instruction for burst transfer of a data group beginning with a start address ADDR D to the slave S2. The address selection circuit 210 generates an ID value (ARID="4") for identifying the master M2 and the transaction. The information of the start address ADDR D is transferred along with the ID value through the address transfer path 40 to the slave S2. The slave number "2" obtained by decoding the address ADDR D and the information of the ID value "4" are informed to the data arbiter 240. In the following periods CYC5, CYC6, in accordance with the control of the data arbiter 240, 128-bit wide data is transferred from the slave S2 through the read data transfer path 44 to the master M2.

[Effect of Second Embodiment]

The bus transfer device having the above configuration can simultaneously transfer a plurality of read data having the destination of the same bus master, which can further enhance the transfer speed of read data less than the maximum bus width. This can increase the response speed in read access from the bus master to the bus slave.

Third Embodiment

In the first embodiment, the bus transfer device for simultaneously transferring a plurality of read data whose total data size is less than the bus width outputted from the same slave has been described. In the third embodiment, the configuration of a bus transfer device for simultaneously transferring a plurality of read data whose total data size is less than the bus width outputted from different slaves will be disclosed.

[Configuration of Bus Transfer Device]

Figure 6:
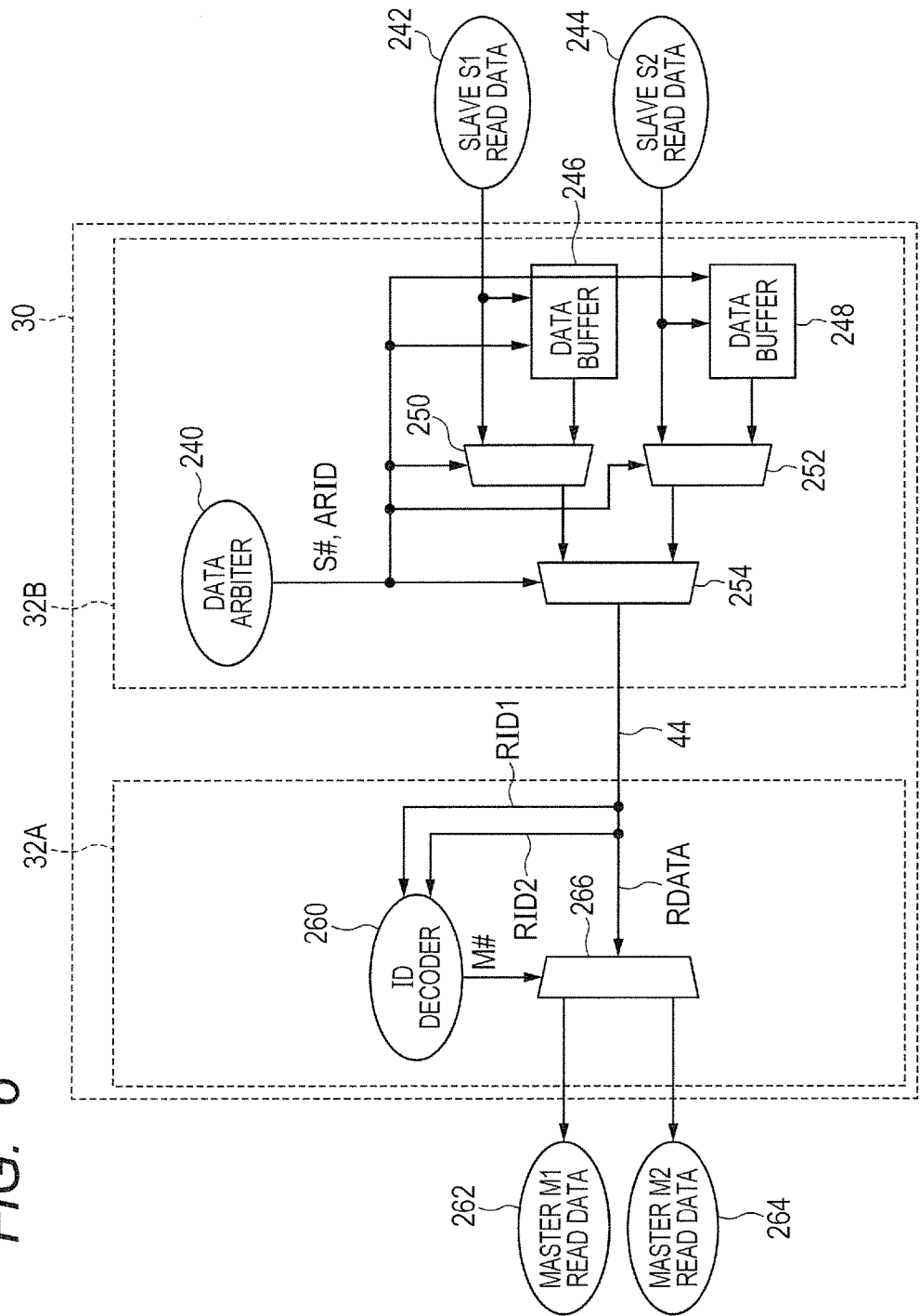
FIG. 6 is a block diagram showing a partial configuration of a bus transfer device according to a third embodiment.

FIG. 6 is a block diagram showing a partial configuration of the bus transfer device according to the third embodiment. FIG. 6 shows only a part related to the read data bus in the bus transfer device of FIG. 2. The configuration of a part related to the address bus is the same as in FIG. 2.

In the third embodiment, the read data 244 read from the bus slave S2 has a data width of n/2 bits or less (the data size is variable and therefore might be equal to n bits). The bus slave S2 outputs the read data 244, the data size, the ID value (RID) corresponding to the read data 244, and the information of a position that the read data occupies in the n-bit data lines configuring the read data transfer path 44. The bus slave S2 automatically determines the information of the position which the read data uses, in association with the read address for storing the read data.

Further, in FIG. 6, the bus transfer device 30 differs from that of FIG. 2 in that the bus control unit 32B of the bus transfer device 30 further includes a data buffer 248 and a multiplexer (data selection circuit) 252. The arbitration result of the data arbiter 240 is informed to the data buffers 246, 248, and the multiplexers (data selection circuits) 250, 252, 254.

The data buffer 248 is used to temporarily hold the read data 244 and the associated information (the ID value, the data size, the position information of the data in the read data bus width) outputted from the slave S2. More specifically, the data buffer 248 is used if the read data 244 outputted from the slave S2 cannot be transferred to the read data transfer path 44 (i.e., when the read data transfer path 44 is being used by the other slave) and the data width of the read data 244 is less than n bits.

Based on the arbitration result informed from the data arbiter 240, the data selection circuit 250 outputs either the read data 242 outputted from the slave S1 or the read data held in the data buffer 246, or selects and simultaneously outputs both of them. Further, if the data selection circuit 250 cannot unify the read data stored in the data buffer 246 and the read data 242 outputted from the slave S1, the data selection circuit 250 informs the information of the ID value, the data size, and the data position of the read data stored in the data buffer 246 to the data selection circuit 254.

Based on the arbitration result informed from the data arbiter 240, the data selection circuit 252 outputs either the read data 244 outputted from the slave S2 or the read data held in the data buffer 248, or selects and simultaneously outputs both of them. Further, if the data selection circuit 252 cannot unify the read data stored in the data buffer 248 and the read data 244 outputted from the slave S2, the data selection circuit 252 informs the information of the ID value, the data size, and the data position of the read data stored in the data buffer 248 to the data selection circuit 254.

Based on the arbitration result informed from the data arbiter 240, the data selection circuit 254 outputs either the output result of the data selection circuit 250 or the output result of the data selection circuit 252, or selects and simultaneously outputs both of them. If the data selection circuit 254 receives the information of the read data stored in the data buffers 246, 248 from the data selection circuits 250, 252 respectively and can unify these read data, the data selection circuit 254 unifies and outputs these read data. The data selection circuit 254 determines that it is possible to simultaneously output both the output results of the data selection circuits 250, 252 if the following conditions R4 to R6 are satisfied.

(Condition R4) One of the ID value of the read data selected by the data selection circuit 250 and the ID value of the read data selected by the data selection circuit 252 matches the ID value of the first priority indicated as the arbitration result by the data arbiter 240, and the other matches the ID value of the second priority. That is, the data arbiter 240 indicates one ID value as the previous arbitration result, and indicates the other ID value as the current arbitration result.

(Condition R5) The master of the transfer destination of the read data selected by the data selection circuit 250 differs from the master of the transfer destination of the read data selected by the data selection circuit 252.

(Condition R6) A data position on the transfer path 44 used by the read data selected by the data selection circuit 250 does not overlap with a data position on the transfer path 44 used by the read data selected by the data selection circuit 252.

Since the rest of FIG. 6 is the same as in FIG. 2, the same or equivalent sections are denoted by the same reference numerals, and their description will not be repeated.

[Specific Example of Read Data Transfer]

Figure 7:
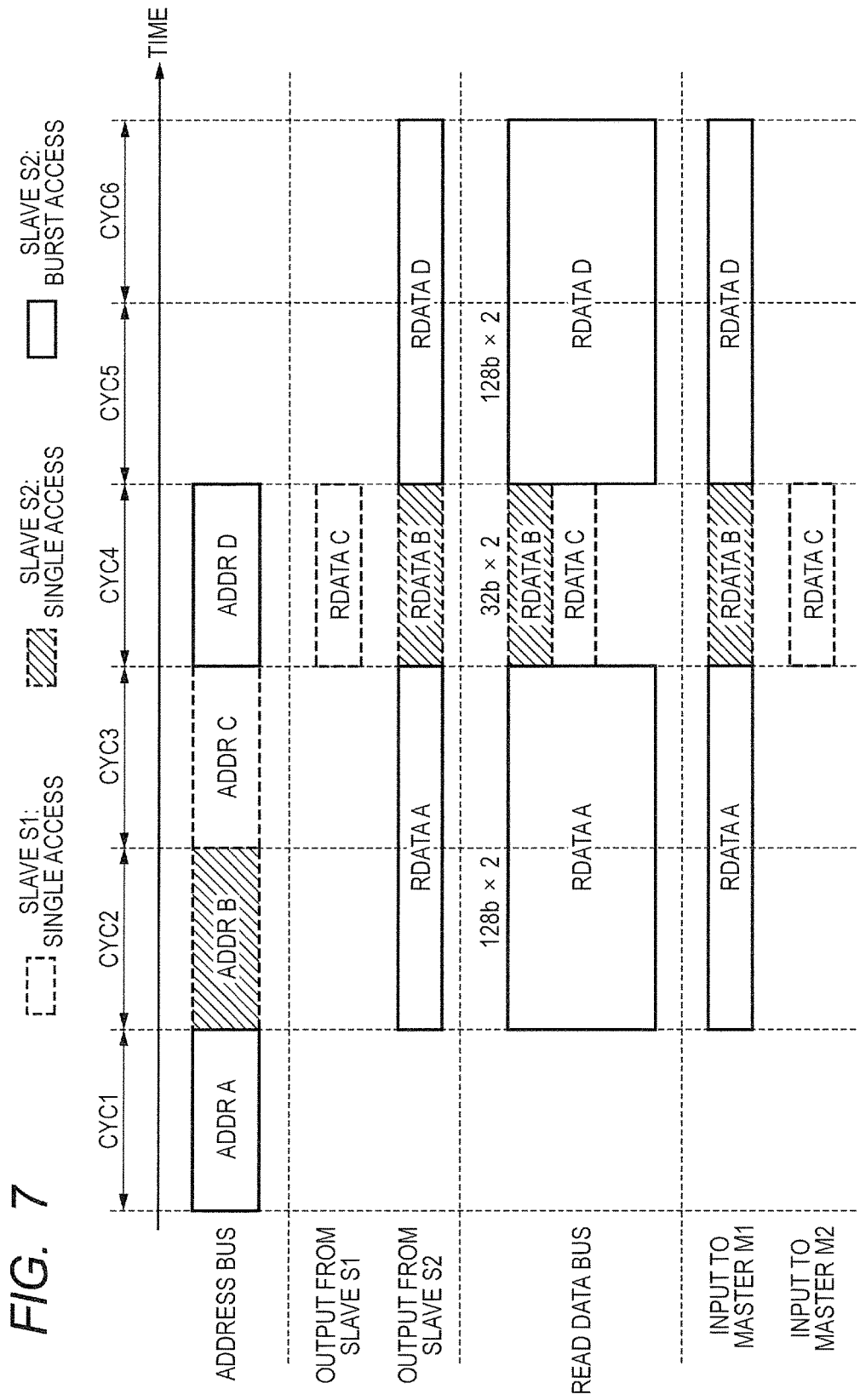
FIG. 7 is a timing chart showing a specific example of read data transfer by the bus transfer device of FIG. 6.

FIG. 7 is a timing chart showing a specific example of read data transfer by the bus transfer device 30 of FIG. 6. FIG. 7 shows, in order from the top, read addresses being transferred on the address bus, read data outputted from the slave S1, read data outputted from the slave S2, read data being transferred on the read data bus, input data to the master M1, and input data to the master M2. In FIG. 7, the horizontal axis represents the time, containing six periods from a first period CYC1 to a sixth period CYC6 of a clock signal.

Referring to FIGS. 6 and 7, in the first period CYC1, the master M1 issues an instruction for burst transfer of a data group beginning with a start address ADDR A to the slave S2. The address selection circuit 210 generates an ID value (ARID="1") for identifying the master M1 and the transaction. The information of the start address ADDR A is transferred along with the ID value through the address transfer path 40 to the slave S2. The slave number "2" obtained by decoding the address ADDR A and the information of the ID value "1" are informed to the data arbiter 240. In the following periods CYC2, CYC3, in accordance with the control of the data arbiter 240, 128-bit wide data is transferred from the slave S2 through the read data transfer path 44 to the master M1.

In the second period CYC2, the master M1 issues an instruction (single access) for transfer of data stored in an address ADDR B to the slave S2. The address selection circuit 210 generates an ID value (ARID="2") for identifying the master M1 and the transaction. The information of the address ADDR B is transferred along with the ID value through the address transfer path 40 to the slave S2. The slave number "2" obtained by decoding the address ADDR B and the information of the ID value "2" are informed to the data arbiter 240. In the next period CYC3, the read data 244 from the slave S2 is still being transferred. Accordingly, in the fourth period CYC4, the read data RDATA B corresponding to the address ADDR B and the associated information (the ID value "2" etc.) are outputted from the slave S2.

In the third period CYC3, the master M2 issues an instruction (single access) for transfer of data stored in an address ADDR C to the slave S1. The address selection circuit 210 generates an ID value (ARID="3") for identifying the master M2 and the transaction. The information of the address ADDR C is transferred along with the ID value through the address transfer path 40 to the slave S1. The slave number "1" obtained by decoding the address ADDR C and the information of the ID value "3" are informed to the data arbiter 240.

In the next period CYC4, read data RDATA C and the associated information (the ID value "3" etc.) are outputted from the slave S1. These data are selected by the data selection circuit 250 and consequently inputted to the data selection circuit 254. Further, the read data RDATA B and the associated information (the ID value "2" etc.) are outputted from the slave S2. These data are selected by the data selection circuit 252 and consequently inputted to the data selection circuit 254. Assume that there is no overlap between the bit positions of the read data RDATA B and the read data RDATA C on the read data transfer path 44.

The data selection circuit 254 determines that it is possible to unify and simultaneously output the read data RDATA C selected by the data selection circuit 250 and the read data RDATA B selected by the data selection circuit 252. Further, the data selection circuit 254 outputs the unified read data and the corresponding ID values "2" and "3" to the read data transfer path 44. The ID value "2" and the ID value "3" are transferred to the ID decoder 260. The ID decoder 260 informs the master numbers M# corresponding respectively to the ID value "2" and the ID value "3" to the data distribution circuit 266. The data distribution circuit 266 inputs the read data (RDATA B) 262 to the master M1 and inputs the read data (RDATA C) 264 to the master M2, in accordance with the informed master numbers M#.

Further, in the fourth period CYC4, the master M1 issues an instruction for burst transfer of a data group beginning with a start address ADDR D to the slave S2. The address selection circuit 210 generates an ID value (ARID="1") for identifying the master M1 and the transaction. The information of the start address ADDR D is transferred along with the ID value through the address transfer path 40 to the slave S2. The slave number "2" obtained by decoding the address ADDR D and the information of the ID value "1" are informed to the data arbiter 240. In the following periods CYC5, CYC6, in accordance with the control of the data arbiter 240, 128-bit wide data is transferred from the slave S2 through the read data transfer path 44 to the master M1.

Effect of Third Embodiment

The bus transfer device having the above configuration can simultaneously transfer read data outputted from different bus slaves to different bus masters, which can further enhance the transfer capability of read data having the data size less than the maximum bus width. This can increase the response speed in read access from the bus master to the bus slave. Further, the third embodiment can be combined with the second embodiment. This can make it possible to simultaneously transfer two pieces of read data outputted from different bus slaves to the same bus master over the read data bus.

Fourth Embodiment

Figure 8:
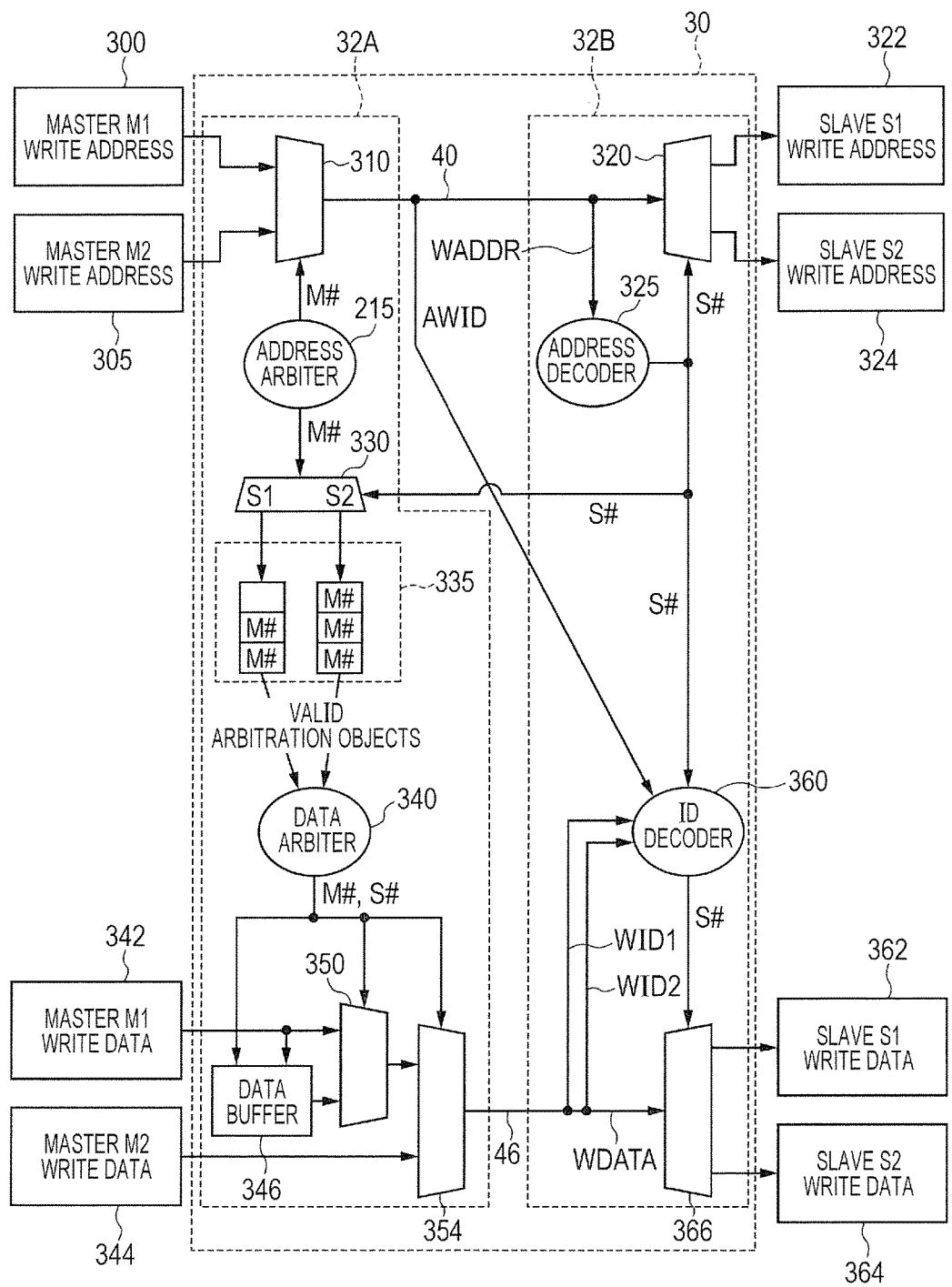
FIG. 8 is a block diagram showing the detailed configuration of a part related to write address transfer and write data transfer in the bus transfer device of FIG. 1.

FIG. 8 is a block diagram showing the detailed configuration of a part related to write address transfer and write data transfer in the bus transfer device of FIG. 1. Referring to FIG. 8, the bus control unit 32 includes an address arbiter 315, an address decoder 325, a state logic circuit 335, a data arbiter 340, an ID decoder 360, a data buffer 346, multiplexers 310, 350, 354, and demultiplexers 320, 330, 366.

[Transfer of Write Address]

First, the transfer of the write address will be described. As shown in FIG. 8, the bus master M1 outputs a write address 300 and an ID value (AWID) to the address transfer path 40, and outputs write data 342 and an ID value (WID) to the write data transfer path 46. Similarly, the bus master M2 outputs a write address 305 and an ID value (AWID) to the address transfer path 40, and outputs write data 344 and an ID value (WID) to the write data transfer path 46. The ID value is identification information for identifying which bus master has issued which write transaction. In FIG. 8, "AWID" is shown to emphasize the ID value that is associated with the write address. In the case of the same transaction, the ID value (AWID) associated with the write address is identical to an ID value (WID) associated with the write data.

In place of the bus masters M1, M2, the control unit 32A of the bus transfer device 30 may generate the ID value and transfer the write address and the write data along with the generated ID value to the bus slave. For example, in FIG. 8, an address selection circuit (multiplexer) 310 may add the ID value (AWID) to the write address in order of output from each bus master M1, M2, and a data selection circuit (multiplexer) 354 may add the ID value (WID) to the write data in order of output from each bus master M1, M2. Thus, by adding the ID value in order of output, the same ID value can be added to the write address and the corresponding write data.

The address selection circuit (multiplexer) 310 receives the write addresses 300, 305 from the two different bus masters M1, M2, respectively. The address arbiter 315 controls the multiplexer 310 to perform arbitration between a plurality of write addresses requiring the use of the address bus. At this time, the address arbiter 315 issues a master number M# indicating the bus master permitted to access the address transfer path 40. The issued master number M# is outputted to a master number distribution circuit (demultiplexer) 330.

Each write address (WADDR) and ID value (AWID) is sent through the address transfer path 40 to an address distribution circuit (demultiplexer) 320 from the address selection circuit (multiplexer) 310. The address distribution circuit 320 is controlled by output from the address decoder 325. More specifically, the address decoder 325 decodes the write address WADDR and thereby determines a slave number S# indicating a target bus slave, and outputs the determined slave number S# to the demultiplexer 320. The address distribution circuit 320 outputs the write address and the corresponding ID value as a write address 322 for the slave S1 or a write address 324 for the slave S2 to the required target bus slave, in accordance with the slave number S#. The slave number S# is also informed to the master number distribution circuit (demultiplexer) 330.

It can be conceptually considered that in the state logic circuit 335, a FIFO buffer for storing the information of the master number M# is provided for each slave number. The demultiplexer 330 sends the master number M# received from the address arbiter 315 to an appropriate FIFO buffer in the state logic circuit 335, based on the slave number S# informed from the address decoder 325. The information of the master number M# in the state logic circuit 335 is held in the state logic circuit 235 until selected as an arbitration result by the data arbiter 340.

[Arbitration by Data Arbiter]

By referring to the state logic circuit 335, the data arbiter 340 sequentially selects write data to be transferred through the write data bus 46. Since the master number M# that has been first inputted to each FIFO buffer is subject to arbitration, there is only one valid arbitration object for the same slave number S# (the bus slave of a transfer destination). If a plurality of FIFO buffers each store the master number M# therein, a plurality of valid arbitration objects (a plurality of master numbers M#) are presented to the data arbiter 340.

Accordingly, if there is only one valid arbitration object in the state logic circuit 335, the data arbiter 340 extracts the master number M# of the valid arbitration object from the FIFO buffer, and informs the master number M# along with the corresponding slave number S# to data selection circuits (multiplexers) 350, 354, and the data buffer 346. If there are a plurality of valid arbitration objects, the data arbiter 340 determines the master number M# of the output source of write data to be transferred next in accordance with a predetermined arbitration guideline (predetermined priority order). The data arbiter 340 extracts the determined master number M# from the corresponding FIFO buffer, and informs the master number M# along with the corresponding slave number S# to the data selection circuits (multiplexers) 350, 354, and the data buffer 346. The data arbiter 340 can assign priorities to the valid arbitration objects, based on the master, the slave, the ID value, or any combination thereof.

[Transfer of Write Data]

Next, the transfer of the write data will be described. The write data transfer path 46 shown in FIG. 8 can transfer data having a maximum bit width of n bits. Further, the write data transfer path 46 can transfer, along with the write data, a plurality of ID values (two ID values (WID1, WID2) in FIG. 8) for identifying the write data WDATA. For example, in the case where it is possible to transfer two m-bit ID values, the number of signal lines necessary for the write data transfer path 46 is n+2×m.

Hereinafter, the write data 342 outputted from the bus master M1 has a data width of n/2 bits or less (if the data width of the write data 342 is variable, the data width might be equal to n bits). The write data 344 outputted from the bus master M2 has a data width of n bits. In the case of a burst mode, n-bit wide data is repeatedly outputted multiple times from the bus master M2. Further, the bus masters M1, M2 output associated information such as the ID value, besides the write data.

More specifically, the bus master M1 outputs the write data 342, the ID value (WID) corresponding to the write data 342, and the information of a position that the write data occupies in the width of n-bit data lines configuring the write data transfer path 46. The bus master M1 can automatically determine the information of the position which the write data uses, based on the write address corresponding to the write data. If the data width of the write data 342 outputted from the bus master M1 is variable, the information of a data size is also outputted from the bus master M1.

The bus master M2 outputs the write data 344 and the ID value (WID) corresponding to the write data 344. The data arbiter 340 informs the master number M# as an arbitration result and the corresponding slave number S# to the multiplexers (data selection circuits) 350, 354, and the data buffer 346.

If the write data 342 outputted from the master M1 cannot be transferred to the write data transfer path 46 and the data width of the write data 342 is less than n bits, the data buffer 346 is used to temporarily hold the write data 342 and the associated information (the ID value, the position information of the data in the write data bus width).

In accordance with the arbitration result of the data arbiter 340, the data selection circuit (multiplexer) 350 outputs either the write data 342 outputted from the master M1 or the write data held in the data buffer 346, or selects and simultaneously outputs both of them. Conditions for simultaneously outputting two pieces of write data will be described later. When the write data is outputted from the data selection circuit 350, the corresponding ID value (WID) is also outputted. Therefore, when both the write data 342 outputted from the master M1 and the write data held in the data buffer 346 are simultaneously outputted, the corresponding two ID values (WID1, WID2) are also outputted.

In accordance with the arbitration result (the master number M#) informed from the data arbiter 340, the data selection circuit (multiplexer) 354 selects either the output result of the multiplexer (data selection circuit) 350 (if the number of the master M1 is informed) or the write data 344 from the bus master M2. The multiplexer (data selection circuit) 354 outputs the selected write data and the corresponding ID value to the write data transfer path 46.

The ID value (WID1, WID2) transferred through the write data transfer path 46 is inputted to the ID decoder 360, and the write data WDATA transferred through the write data transfer path 46 is inputted to the demultiplexer (data distribution circuit) 366.

The ID decoder 360 receives the ID value (AWID) associated with the write address issued from each bus master and the slave number S# obtained by decoding the write address. Based on the received information, the ID decoder 360 holds information indicating the correspondence relationship between the ID value (AWID) and the slave number S#, e.g., in the form of a look-up table. By referring to the look-up table, the ID decoder 360 determines the slave number S# corresponding to the ID value (WID1, WID2) received through the write data transfer path 46.

In accordance with the slave number S# informed from the ID decoder 360, the data distribution circuit (demultiplexer) 366 distributes the write data WDATA received through the write data transfer path 46, as write data 362 to the bus slave S1 or write data 364 to the bus slave S2. If both the write data 342 outputted from the master M1 and the write data held in the data buffer 346 are simultaneously outputted, the demultiplexer 366 outputs these write data to the slaves S1, S2, respectively, in accordance with the two slave numbers S# corresponding to the ID values (WID1, WID2).

[Conditions for Simultaneously Outputting Two Pieces of Write Data]

Hereinafter, conditions for simultaneously outputting two pieces of write data from the data selection circuit 350 will be described. The data selection circuit 350 determines that it is possible to simultaneously output the write data held in the data buffer 346 and the write data 342 outputted from the master M1 if all the following conditions are satisfied.

(Condition W1) The write data from the master M1 is stored in the data buffer 346 in accordance with the previous arbitration result, and the master M1 is again informed as the arbitration result this time.

(Condition W2) The bus slave of the transfer destination of the write data stored in the data buffer 346 differs from the bus slave of the transfer destination of the write data 342 from the master M1. The information (slave number S#) of the bus slave of the transfer destination along with the master number M# is informed as the arbitration result from the data arbiter 340.

(Condition W3) A data position on the transfer path 46 used by the write data 342 outputted from the master M1 does not overlap with a data position on the transfer path 46 used by the write data held in the data buffer 346.

[Specific Example of Write Data Transfer]

Figure 9:
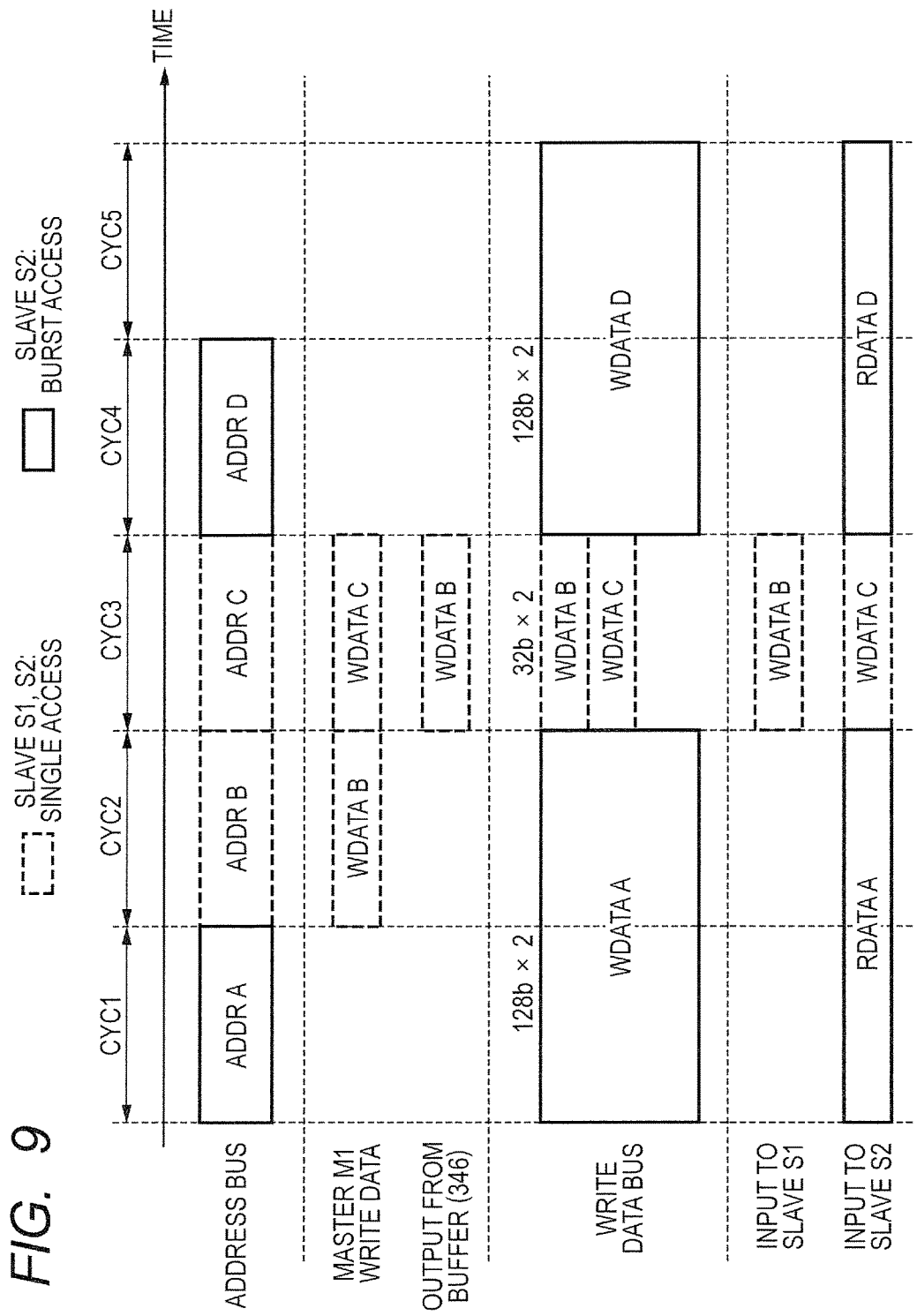
FIG. 9 is a timing chart showing a specific example of write data transfer by the bus transfer device of FIG. 8.

FIG. 9 is a timing chart showing a specific example of write data transfer by the bus transfer device 30 of FIG. 8. FIG. 9 shows, in order from the top, write addresses being transferred on the address bus, write data outputted from the master M1, output data from the data buffer 346, write data being transferred on the write data bus, input data to the slave S1, and input data to the slave S2. In FIG. 9, the horizontal axis represents the time, containing five periods from a first period CYC1 to a fifth period CYC5 of a clock signal.

Referring to FIGS. 8 and 9, in the first period CYC1, the master M2 issues an instruction for burst write to the slave S2 (transaction ID value="1"). Accordingly, the master M2 outputs a start address ADDR A and the ID value "1" toward the address transfer path 40 in the first period CYC1, and outputs write data WDATA A (128 bits×2) and the associated information (the ID value "1") in the first period CYC1 and the second period CYC2. The master number "2" indicating the master M2 of the transfer source is informed to the data arbiter 340, and in accordance with the control of the data arbiter 340, the write data WDATA A from the master M2 is outputted through the data selection circuit 354 to the write data transfer path 46. Further, in accordance with the control of the ID decoder 360, the write data WDATA A is inputted through the data distribution circuit 366 to the slave S2.

In the second period CYC2, the master M1 issues an instruction for single write to the slave S1 (transaction ID value="2"). Accordingly, in the second period CYC2, the master M1 outputs an address ADDR_B and the ID value "2" toward the address transfer path 40, and outputs write data WDATA_B and the associated information (the ID value "2" etc.). Further, the master number "1" indicating the master M1 of the transfer source is informed through the data arbiter 340 to the data selection circuit 350. Since the data width (32 bits) of the write data WDATA B is less than the data width (n=128 bits) of the write data transfer path 46 and the write data transfer path 46 is being used by the other write data WDATA A, the data selection circuit 350 causes the write data WDATA B and the associated information to be temporarily held in the data buffer 346.

In the third period CYC3, the master M1 issues an instruction for single write to the slave S2 (transaction ID value="3"). Accordingly, in the third period CYC3, the master M1 outputs an address ADDR C and the ID value "3" toward the address transfer path 40, and outputs write data WDATA_C and the associated information (the ID value "3" etc.). Further, the master number "1" indicating the master M1 of the transfer source is informed through the data arbiter 340 to the data selection circuit 350. Assume that the data position of the write data WDATA_C (having a data width of 32 bits) on the data transfer path 46 does not overlap with the write data WDATA B held in the data buffer 346.

The data selection circuit 350 determines and informs to the data selection circuit 354 that it is possible to unify and output the write data WDATA B held in the data buffer 346 and the write data WDATA C outputted from the master M1. The data selection circuit 354 outputs the unified write data (WDATA B, WDATA C) having a data width of 64 bits, the ID value "2" corresponding to the write data WDATA B, and the ID value "3" corresponding to the write data WDATA C to the write data transfer path 46. The ID value "2" and the ID value "3" are transferred to the ID decoder 360. The ID decoder 360 informs the slave numbers S# corresponding respectively to the ID value "2" and the ID value "3" to the data distribution circuit 366. The data distribution circuit 366 inputs the write data (WDATA B) 362 to the slave S1 and inputs the write data (WDATA C) 364 to the slave S2, in accordance with the informed slave numbers M#.

In the fourth period CYC4, the master M2 issues an instruction for burst write to the slave S2 (transaction ID value="1"). Accordingly, the master M2 outputs a start address ADDR D and the ID value "1" toward the address transfer path 40 in the fourth period CYC4, and outputs write data WDATA D (128 bits×2) and the associated information (the ID value "1") in the fourth period CYC4 and the fifth period CYC5. The master number "2" indicating the master M2 of the transfer source is informed to the data arbiter 340, and in accordance with the control of the data arbiter 340, the write data WDATA D from the master M2 is outputted through the data selection circuit 354 to the write data transfer path 46. Further, in accordance with the control of the ID decoder 360, the write data WDATA D is inputted through the data distribution circuit 366 to the slave S2.

[Effect of Fourth Embodiment]

The above-described bus transfer device 30 can transfer, on the write data bus having a bus width of n bits, two pieces of write data whose total data width is less than the bus width. In this case, two transaction ID values corresponding respectively to the two pieces of write data are also simultaneously transferred. Consequently, it is possible to enhance the transfer speed of write data less than the maximum bus width, which can increase a response speed in write access from the bus master to the bus slave.

[Modification]

In the example of FIG. 8, two bus masters and two bus slaves are illustrated. However, the invention is not limited to such a configuration, and the above technique is also applicable to a larger number of bus masters and a larger number of bus slaves.

Further, while the example of unifying and transferring two pieces of write data has been shown, it is possible in principle to unify and transfer more write data within the bus width n of the write data transfer path. In this case, it is necessary to have data buffers according to the number of data to be unified and simultaneously transfer ID values corresponding respectively to the write data to be unified.

Fifth Embodiment

In the fourth embodiment, the unification and bus transfer of a plurality of write data having the transfer destinations of different bus slaves has been described. In the fifth embodiment, the unification and bus transfer of a plurality of write data having the transfer destination of the same bus slave will be described. In this case, the condition W2 is not necessary, and the data selection circuit 350 determines that it is possible to simultaneously output the write data held in the data buffer 346 and the write data 342 outputted from the master M1 if the conditions W1 and W3 are satisfied. Hereinafter, a detailed description will be made with reference to the drawings.

[Configuration of Bus Transfer Device]

Figure 10:
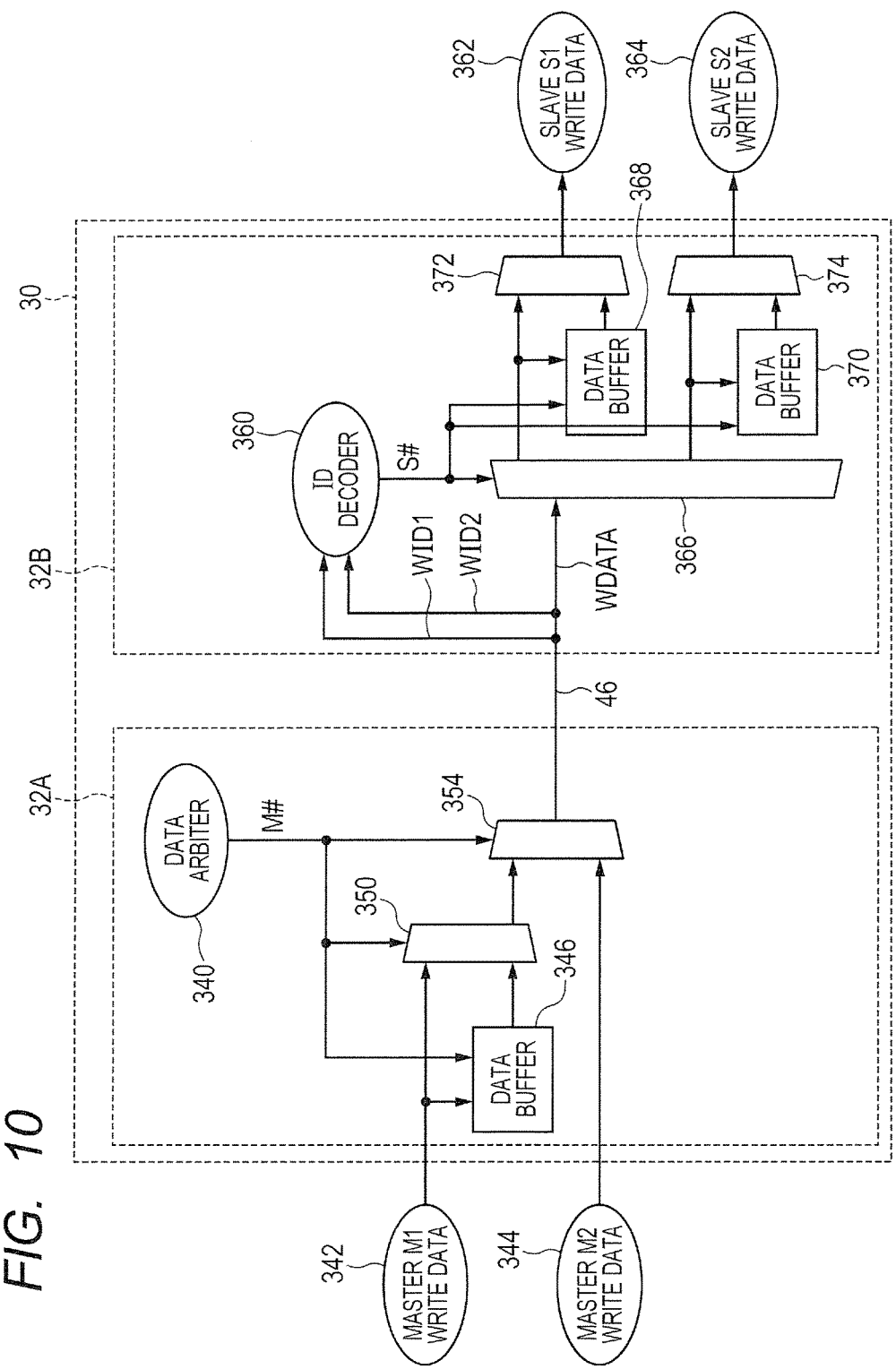
FIG. 10 is a block diagram showing a partial configuration of a bus transfer device according to a fifth embodiment.

FIG. 10 is a block diagram showing a partial configuration of a bus transfer device according to the fifth embodiment. FIG. 10 shows only a part related to the write data bus in the bus transfer device of FIG. 8. The configuration of a part related to the address bus is the same as in FIG. 8. However, in the fifth embodiment, the data arbiter 340 informs the master number M# as an arbitration result, but does not need to inform the slave number S# corresponding to the master number M# (because the determination of the condition W2 is not necessary).

As shown in FIG. 10, the bus transfer device 30 differs from that of FIG. 8 in that the bus control unit 32B of the bus transfer device 30 further includes data buffers 368, 370 and multiplexers (data selection circuits) 372, 374. Since the rest of FIG. 10 is the same as in FIG. 8, the same or equivalent sections are denoted by the same reference numerals, and their description will not be repeated.

The fifth embodiment is characterized in that it is possible to unify two pieces of write data having the transfer destination of the same bus slave (the condition W2 is not necessary). In this case, the write data of higher priority is immediately inputted to the bus slave of the transfer destination, whereas the write data of lower priority is temporarily held in the data buffer 368 or 370. The write data of lower priority is inputted to the bus slave of the transfer destination from the data buffer after the write data of higher priority is inputted. Thus, the two pieces of write data are inputted to the same bus slave in order of priority determined by the data arbiter 340.

More specifically, if both the conditions W1 and W3 are satisfied (the condition W2 is not necessary), the data selection circuit 350 unifies the write data held in the data buffer 346 and the write data 342 outputted from the master M1. The unified write data WDATA and the two ID values (WID1, WID2) corresponding respectively to the pre-unified write data are simultaneously outputted to the write data transfer path 46. Assume that the same bus slave (slave number S#) corresponds to the two ID values (WID1, WID2).

If the slave numbers S# corresponding to the two ID values (WID1, WID2) transferred through the write data transfer path 46 are the same, the ID decoder 360 informs the simultaneous transfer of data to the data buffer, corresponding to the appropriate master, of the data buffers 368, 370. In accordance with the control of the ID decoder 360, the data distribution circuit 366 inputs a part, corresponding to the write data held in the data buffer 346, of the transferred write data to the appropriate slave, and stores the remaining part in the corresponding data buffer 368 or 370. That is, the write data first outputted from the master M1 is inputted to the appropriate slave, and the write data next outputted from the master M1 is inputted to the corresponding data buffer. In the next period, the write data stored in the corresponding data buffer 368 or 370 is inputted to the appropriate slave.

[Specific Example of Write Data Transfer]

Figure 11:
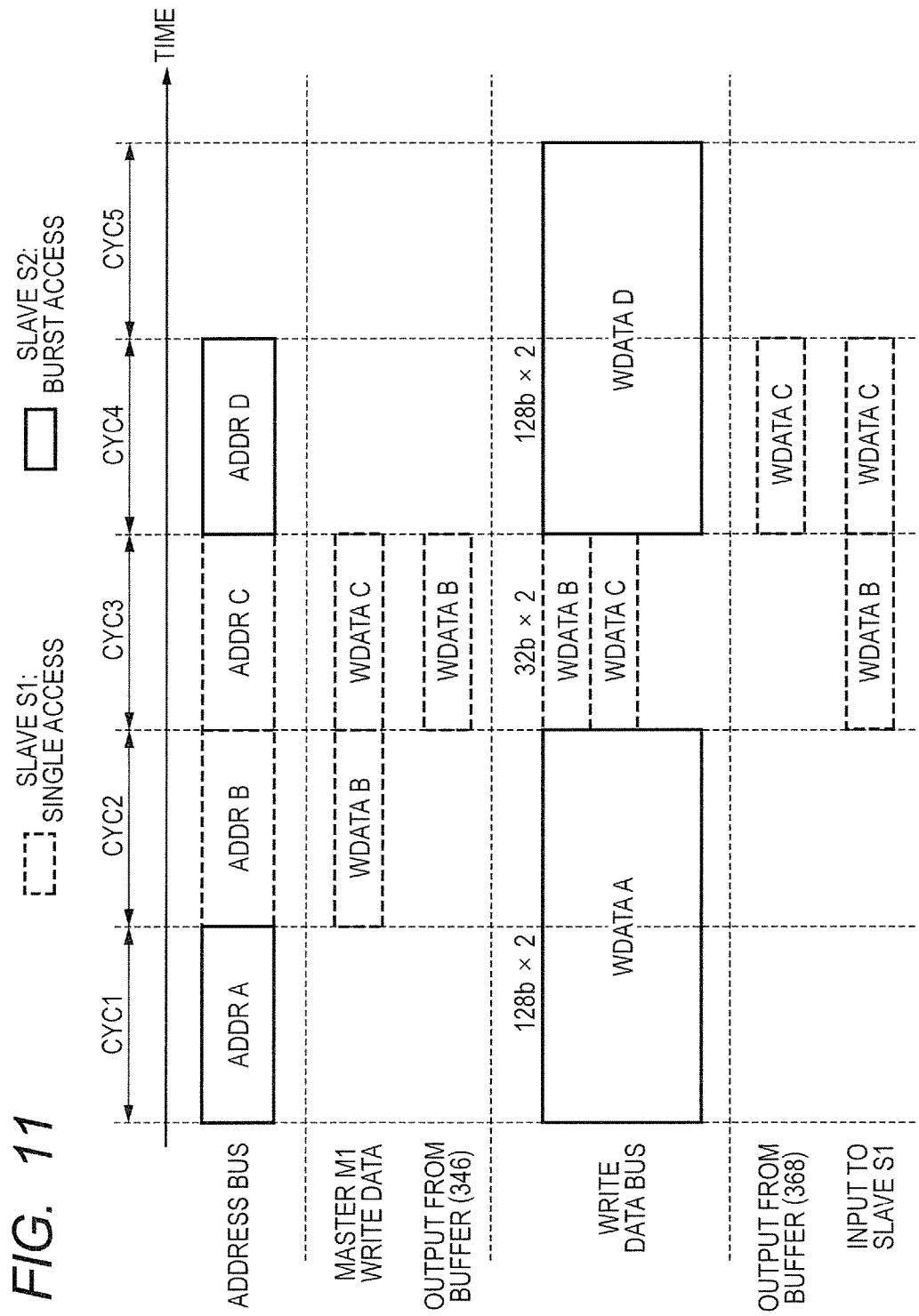
FIG. 11 is a timing chart showing a specific example of write data transfer by the bus transfer device of FIG. 10.

FIG. 11 is a timing chart showing a specific example of write data transfer by the bus transfer device 30 of FIG. 10. FIG. 11 shows, in order from the top, write addresses being transferred on the address bus, write data outputted from the master M1, output data from the data buffer 346, write data being transferred on the write data bus, input data to the data buffer 368, and input data to the slave S1. In FIG. 11, the horizontal axis represents the time, containing five periods from a first period CYC1 to a fifth period CYC5 of a clock signal.

Referring to FIGS. 10 and 11, operations in the first period CYC1 and the second period CYC2 in FIG. 11 are the same as in FIG. 9, and therefore will not be described again.

In the third period CYC3, the master M1 issues an instruction for single write to the slave S1 (transaction ID value="3"). Unlike this, in FIG. 9, the master M1 issues the instruction for single write to the slave S2. With the issue of the instruction for single write, in the third period CYC3, the master M1 outputs an address ADDR C and the ID value "3" toward the address transfer path 40, and outputs write data WDATA_C (32 bits) and the associated information (the ID value "3" etc.). Assume that the data position of the write data WDATA_C on the data transfer path 46 does not overlap with the write data WDATA B held in the data buffer 346. In either the second period CYC2 or the third period CYC3, the data arbiter 340 informs the master number "1" (corresponding to the master M1) as an arbitration result to the data selection circuit 350.

Consequently, the data selection circuit 350 determines and informs to the data selection circuit 354 that it is possible to unify and output the write data WDATA B held in the data buffer 346 and the write data WDATA C outputted from the master M1. The data selection circuit 354 outputs the unified write data (WDATA B, WDATA C) having a data width of 64 bits, the ID value "2" corresponding to the write data WDATA B, and the ID value "3" corresponding to the write data WDATA C to the write data transfer path 46. The ID value "2" and the ID value "3" are transferred to the ID decoder 360.

If the ID decoder 360 determines that the slave numbers S# corresponding respectively to the ID value "2" and the ID value "3" are the same "1" (corresponding to the slave S1), the ID decoder 360 informs the simultaneous transfer of write data to the data distribution circuit 366 and the data buffer 368 corresponding to the slave S1. In accordance with the control of the ID decoder 360, the data distribution circuit 366 inputs a part, corresponding to the write data WDATA B held in the data buffer 346, of the transferred write data to the appropriate slave S1, and stores the write data WDATA C which is the remaining part into the data buffer 368. In the next period CYC4, the write data RDATA C stored in the data buffer 368 is inputted to the slave S1.

In the fourth period CYC4, the master M2 issues an instruction for burst write to the slave S2 (transaction ID value="1"). Accordingly, the master M2 outputs a start address ADDR D and the ID value "1" toward the address transfer path 40 in the fourth period CYC4, and outputs write data WDATA D (128 bits×2) and the associated information (the ID value "1") in the fourth period CYC4 and the fifth period CYC5. The outputted write data WDATA D is outputted to the write data transfer path 46 in accordance with the control of the data arbiter 340, and inputted to the slave S2 in accordance with the control of the ID decoder 360.

Effect of Fifth Embodiment

The bus transfer device having the above configuration can simultaneously transfer a plurality of write data having the transfer destination of the same slave, which can enhance the transfer speed of write data less than the maximum bus width. This can increase the response speed in write access from the bus master to the bus slave.

Sixth Embodiment

In the fourth embodiment, the bus transfer device for simultaneously transferring a plurality of write data whose total data size is less than the bus width outputted from the same master has been described. In the sixth embodiment, the configuration of a bus transfer device for simultaneously transferring a plurality of write data whose total data size is less than the bus width outputted from different masters will be disclosed.

[Configuration of Bus Transfer Device]

Figure 12:
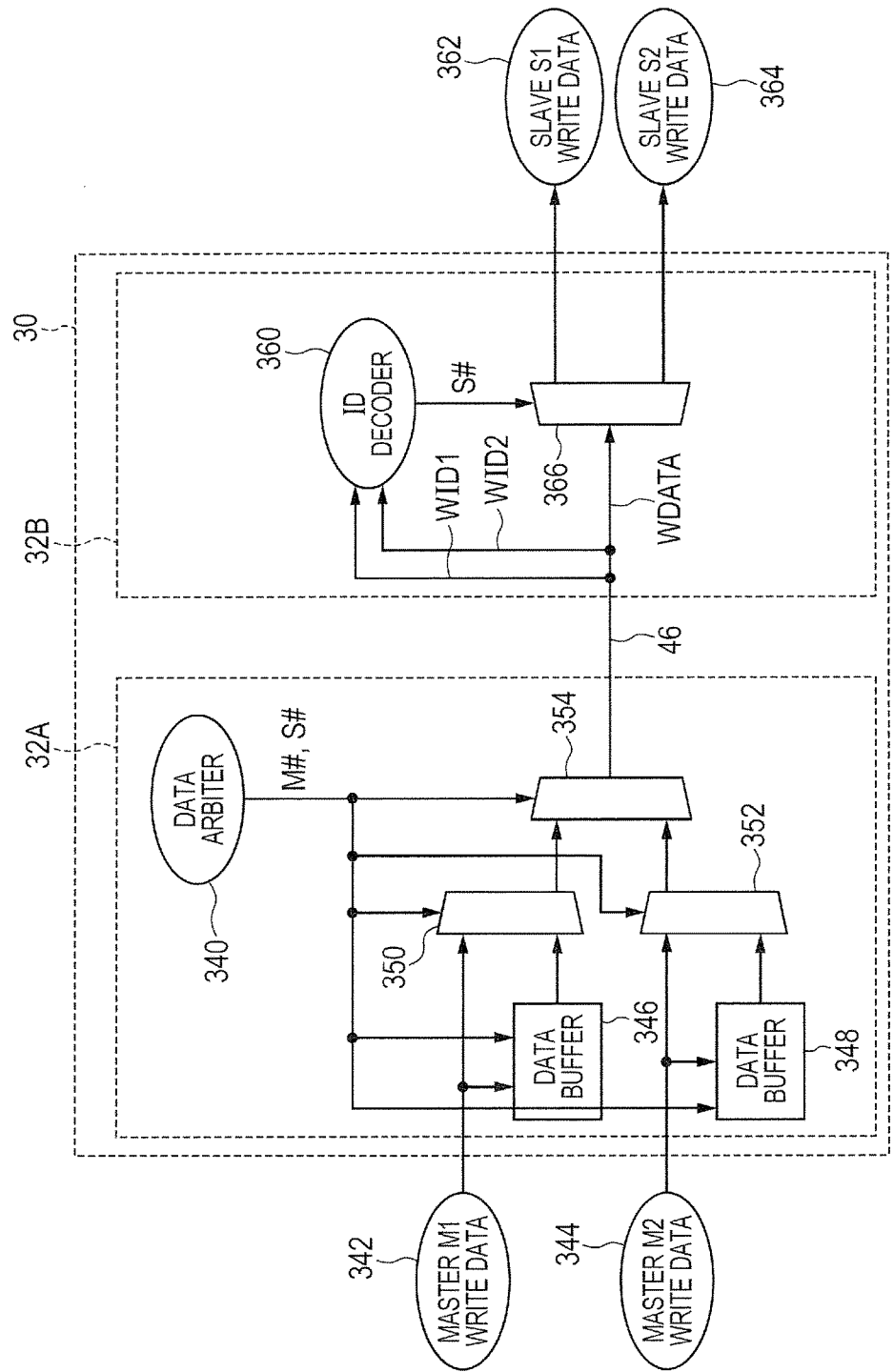
FIG. 12 is a block diagram showing a partial configuration of a bus transfer device according to a sixth embodiment.

FIG. 12 is a block diagram showing a partial configuration of the bus transfer device according to the sixth embodiment. FIG. 12 shows only a part related to the write data bus in the bus transfer device of FIG. 8. The configuration of a part related to the address bus is the same as in FIG. 8.

In the sixth embodiment, the write data 344 read from the bus master M2 has a data width of n/2 bits or less (the data size is variable and therefore might be equal to n bits). The bus master M2 outputs the write data 344, the data size, the ID value (WID) corresponding to the write data 344, and the information of a position that the write data occupies in the n-bit data lines configuring the write data transfer path 46. The bus master M2 automatically determines the information of the position which the write data uses, in association with the write address for storing the write data.

Further, in FIG. 12, the bus transfer device 30 differs from that of FIG. 8 in that the bus control unit 32A of the bus transfer device 30 further includes a data buffer 348 and a multiplexer (data selection circuit) 352. The arbitration result of the data arbiter 340 is informed to the data buffers 346, 348, and the multiplexers (data selection circuits) 350, 352, 354.

If the write data 344 outputted from the master M2 cannot be transferred to the write data transfer path 46 and the data width of the write data 344 is less than n bits, the data buffer 348 is used to temporarily hold the write data 344 and the associated information (the ID value, the data size, the position information of the data in the write data bus width).

Based on the arbitration result informed from the data arbiter 340, the data selection circuit 350 outputs either the write data 342 outputted from the master M1 or the write data held in the data buffer 346, or selects and simultaneously outputs both of them. Further, if the data selection circuit 350 cannot unify the write data stored in the data buffer 346 and the write data 342 outputted from the master M1, the data selection circuit 350 informs the information of the ID value, the data size, and the data position of the write data stored in the data buffer 346 to the data selection circuit 354.

Based on the arbitration result informed from the data arbiter 340, the data selection circuit 352 outputs either the read data 344 outputted from the master M2 or the write data held in the data buffer 348, or selects and simultaneously outputs both of them. Further, if the data selection circuit 352 cannot unify the write data stored in the data buffer 348 and the write data 344 outputted from the master M2, the data selection circuit 352 informs the information of the ID value, the data size, and the data position of the write data stored in the data buffer 348 to the data selection circuit 354.

Based on the arbitration result informed from the data arbiter 340, the data selection circuit 354 outputs either the output result of the data selection circuit 350 or the output result of the data selection circuit 352, or selects and simultaneously outputs both of them. If the data selection circuit 354 receives the information of the write data stored in the data buffers 346, 348 from the data selection circuits 350, 352 respectively and can unify these write data, the data selection circuit 354 unifies and outputs these write data. The data selection circuit 354 determines that it is possible to simultaneously output both the output results of the data selection circuits 350, 352 if the following conditions W4 to W6 are satisfied.

(Condition W4) One of the master number of the transfer source of the write data selected by the data selection circuit 350 and the master number of the transfer source of the write data selected by the data selection circuit 352 matches the master number of the first priority indicated as the arbitration result by the data arbiter 340, and the other matches the master number of the second priority. That is, the data arbiter 340 indicates one master number as the previous arbitration result, and indicates the other master number as the current arbitration result.

(Condition W5) The slave of the transfer destination of the write data selected by the data selection circuit 350 differs from the slave of the transfer destination of the write data selected by the data selection circuit 352. The information (slave number S#) of the bus slave of the transfer destination along with the master number M# is informed as the arbitration result from the data arbiter 340.

(Condition W6) A data position on the transfer path 46 used by the write data selected by the data selection circuit 350 does not overlap with a data position on the transfer path 46 used by the write data selected by the data selection circuit 352.

Since the rest of FIG. 12 is the same as in FIG. 8, the same or equivalent sections are denoted by the same reference numerals, and their description will not be repeated.

[Specific Example of Write Data Transfer]

Figure 13:
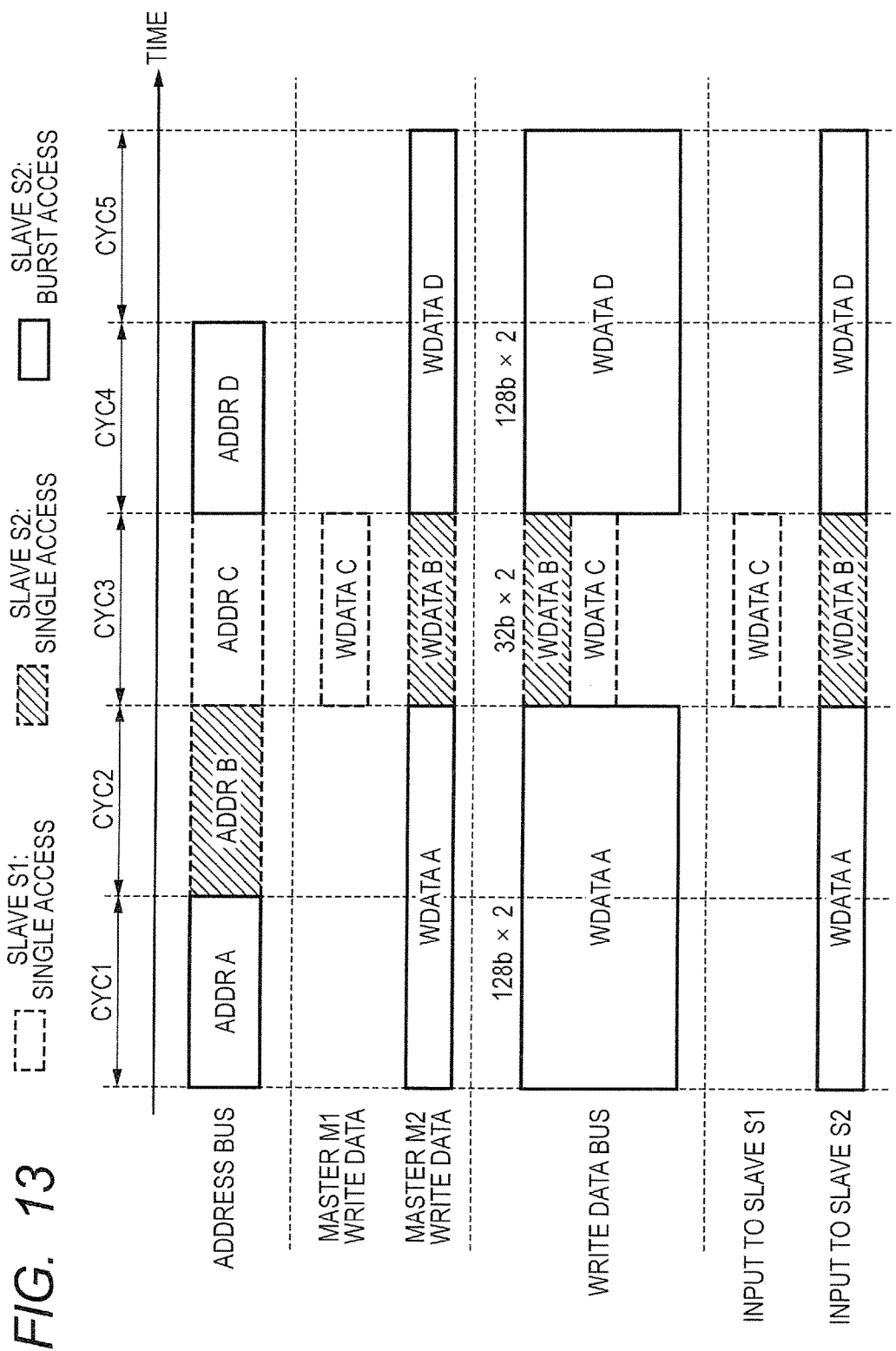
FIG. 13 is a timing chart showing a specific example of write data transfer by the bus transfer device of FIG. 12.

FIG. 13 is a timing chart showing a specific example of write data transfer by the bus transfer device 30 of FIG. 12. FIG. 13 shows, in order from the top, write addresses being transferred on the address bus, write data outputted from the master M1, write data outputted from the master M2, write data being transferred on the write data bus, input data to the slave S1, and input data to the slave S2. In FIG. 13, the horizontal axis represents the time, containing five periods from a first period CYC1 to a fifth period CYC5 of a clock signal.

Referring to FIGS. 12 and 13, in the first period CYC1, the master M2 issues an instruction for burst write to the slave S2 (transaction ID value="1"). Accordingly, the master M2 outputs a start address ADDR A and the ID value "1" toward the address transfer path 40 in the first period CYC1, and outputs write data WDATA A (128 bits×2) and the associated information (the ID value "1") toward the write data transfer path 46 in the first period CYC1 and the second period CYC2.

In the second period CYC2, the master M2 issues an instruction for single write to the slave S2 (transaction ID value="2"). Accordingly, in the second period CYC2, the master M2 outputs an address ADDR_B and the ID value "2" toward the address transfer path 40. In the second period CYC2, the write data WDATA A is still being transferred from the master M2. Accordingly, in the third period CYC3, the master M2 outputs write data WDATA_B (32 bits) and the associated information (the ID value "2" etc.).

In the third period CYC3, the master M1 issues an instruction for single write to the slave S1 (transaction ID value="3"). Accordingly, in the third period CYC3, the master M1 outputs an address ADDR_C and the ID value "3" toward the address transfer path 40, and outputs write data WDATA_C (32 bits) and the associated information (the ID value "3" etc.). Assume that the data position of the write data WDATA_C on the data transfer path 46 does not overlap with the write data WDATA B outputted from the master M2. Further, the data arbiter 340 informs the master number "2" corresponding to the master M2 to the data selection circuit 350 in the second period CYC2, and informs the master number "1" corresponding to the master M1 to the data selection circuit 350 in the third period CYC3. The transfer destination (slave S2) of the write data WDATA_B differs from the transfer destination (slave S1) of the write data WDATA_C.

Consequently, the data selection circuit 350 determines and informs to the data selection circuit 354 that it is possible to unify and output the write data WDATA B outputted from the master M2 and the write data WDATA C outputted from the master M1. The data selection circuit 354 outputs the unified write data (WDATA B, WDATA C) having a data width of 64 bits, the ID value "2" corresponding to the write data WDATA B, and the ID value "3" corresponding to the write data WDATA C to the write data transfer path 46. The ID value "2" and the ID value "3" are transferred to the ID decoder 360. The ID decoder 360 informs the slave numbers "2" and "1" corresponding respectively to the ID values "2" and "3" to the data distribution circuit 366. In accordance with the informed slave numbers "2" and "1", the data distribution circuit 366 inputs the write data (WDATA B) 364 to the slave S2 and inputs the write data (WDATA C) 362 to the slave S1.

In the fourth period CYC4, the master M2 issues an instruction for burst write to the slave S2 (transaction ID value="1"). Accordingly, the master M2 outputs a start address ADDR D and the ID value "1" toward the address transfer path 40 in the fourth period CYC4, and outputs write data WDATA D (128 bits×2) and the associated information (the ID value "1") in the fourth period CYC4 and the fifth period CYC5. The outputted write data WDATA D is outputted to the write data transfer path 46 in accordance with the control of the data arbiter 340, and inputted to the slave S2 in accordance with the control of the ID decoder 360.

Effect of Sixth Embodiment

The bus transfer device having the above configuration can simultaneously transfer write data outputted from different bus masters to different slaves, which can further enhance the transfer capability of write data having the data size less than the maximum bus width. This can increase the response speed in write access from the bus master to the bus slave. Further, the sixth embodiment can be combined with the fifth embodiment. This can make it possible to simultaneously transfer write data outputted from different bus masters to the same slave.

While the invention made above by the present inventors has been described specifically based on the illustrated embodiments, the present invention is not limited thereto. It is needless to say that various changes and modifications can be made thereto without departing from the spirit and scope of the invention.

What is claimed is:

1. A semiconductor device comprising:
a plurality of bus masters;
a plurality of bus slaves; and
a bus transfer device comprising a read data transfer path which can transfer read data having an n-bit width at a maximum,
wherein during data reading, a read address outputted from each bus master is transferred, along with identification information for identifying a bus master of an output source and identifying a transaction, to a bus slave having the read address, and the bus slave having the read address outputs read data corresponding to the read address, along with the identification information, to the bus transfer device, and
wherein if the bus transfer device transfers first read data and second read data which have a total data width of n bits or less, the bus transfer device can unify the first read data and the second read data and simultaneously transfer unified read data, first identification information and second identification information corresponding respectively to the first read data and the second read data through the read data transfer path.

2. The semiconductor device according to claim 1, wherein the bus slaves comprise a first bus slave which outputs read data having a data width of n/2 bits or less, and
wherein the bus transfer device further comprises a first data buffer which is coupled to the first bus slave and holds read data outputted by the first bus slave when the read data transfer path is being used by another bus slave, and a first data selection circuit which is coupled between the first bus slave, the first data buffer and the read data transfer path and can output any one of read data outputted by the first bus slave, read data held in the first data buffer, and data obtained by unifying these read data.

3. The semiconductor device according to claim 2, wherein the bus transfer device further comprises a data distribution circuit coupled between the read data transfer path and the bus masters, and
wherein if the data distribution circuit receives read data obtained by unifying the first read data and the second read data and if a first bus master indicated by the simultaneously transferred first identification information differs from a second bus master indicated by the second identification information, the data distribution circuit inputs the first read data to the first bus master and inputs the second read data to the second bus master.

4. The semiconductor device according to claim 2, wherein the bus transfer device further comprises:
a data distribution circuit coupled between the read data transfer path and the bus masters; and
a plurality of input data buffers which are provided corresponding respectively to the bus masters and are each coupled between the data distribution circuit and the corresponding bus master, and
wherein if the data distribution circuit receives read data obtained by unifying the first read data and the second read data and if a first bus master indicated by the simultaneously transferred first identification information is identical to a bus master indicated by the second identification information, the data distribution circuit inputs read data first outputted from the first bus slave to the first bus master and inputs read data next outputted from the first bus slave to an input data buffer corresponding to the first bus master.

5. The semiconductor device according to claim 2, wherein the bus slaves further comprise a second bus slave which outputs read data having a data width of n/2 bits or less, and wherein the bus transfer device further comprises:
a second data buffer which is coupled to the second bus slave and holds read data outputted by the second bus slave when the read data transfer path is being used by another bus slave;
a second data selection circuit which is coupled between the second bus slave, the second data buffer and the read data transfer path and can output any one of read data outputted by the second bus slave, read data held in the second data buffer, and data obtained by unifying these read data; and
a third data selection circuit which is coupled between the first and second data selection circuits and the read data transfer path and can output any one of read data outputted by the first data selection circuit, read data outputted by the second data selection circuit, and read data obtained by unifying these read data.

6. The semiconductor device according to claim 2, wherein the bus transfer device further comprises a data arbiter for arbitrating priority of output to the read data transfer path between a plurality of read data, and
wherein if the read data held in the first data buffer has first priority and the read data outputted by the first bus slave has second priority, the first data selection circuit can unify and output these read data.

7. The semiconductor device according to claim 1, wherein bits which the first read data and the second read data use on the read data transfer path are determined in accordance with corresponding read addresses, respectively, and
wherein if the bit used by the first read data does not overlap with the bit used by the second read data, the bus transfer device can unify and transfer the first read data and the second read data.

8. A semiconductor device comprising:
a plurality of bus masters;
a plurality of bus slaves; and
a bus transfer device comprising a write data transfer path which can transfer write data having an n-bit width at a maximum,
wherein during data writing, each of a write address and write data outputted from each bus master is transferred, along with identification information for identifying a bus master of an output source and identifying a transaction, to a bus slave having the write address, and wherein if the bus transfer device transfers first write data and second write data which have a total data width of n bits or less, the bus transfer device can unify the first write data and the second write data and simultaneously transfer unified write data, first identification information and second identification information corresponding respectively to the first write data and the second write data through the write data transfer path.

9. The semiconductor device according to claim 8, wherein the bus slaves comprise a first bus master which outputs write data having a data width of n/2 bits or less, and wherein the bus transfer device further comprises:
   a first data buffer which is coupled to the first bus master and holds write data outputted by the first bus master when the write data transfer path is being used by another bus master; and
   a first data selection circuit which is coupled between the first bus master, the first data buffer and the write data transfer path and can output any one of write data outputted by the first bus master, write data held in the first data buffer, and data obtained by unifying these write data.

10. The semiconductor device according to claim 9, wherein the bus transfer device further comprises a data distribution circuit coupled between the write data transfer path and the bus slaves, and wherein if the data distribution circuit receives write data obtained by unifying the first write data and the second write data and if a first bus slave having a write address corresponding to the simultaneously transferred first identification information differs from a second bus slave having a write address corresponding to the second identification information, the data distribution circuit inputs the first write data to the first bus slave and inputs the second write data to the second bus slave.

11. The semiconductor device according to claim 9, wherein the bus transfer device further comprises:
   a data distribution circuit coupled between the write data transfer path and the bus slaves; and
   a plurality of input data buffers which are provided corresponding respectively to the bus slaves and are each coupled between the corresponding bus slave and the data distribution circuit, and wherein if the data distribution circuit receives write data obtained by unifying the first write data and the second write data and if a first bus slave having a write address corresponding to the simultaneously transferred first identification information is identical to a bus slave having a write address corresponding to the second identification information, the data distribution circuit inputs write data first outputted from the first bus master to the first bus slave and inputs write data next outputted from the first bus master to an input data buffer corresponding to the first bus slave.

12. The semiconductor device according to claim 9, wherein the bus masters further comprise a second bus master which outputs write data having a data width of n/2 bits or less, and wherein the bus transfer device further comprises:
   a second data buffer which is coupled to the second bus master and holds write data outputted by the second bus master when the write data transfer path is being used by another bus master;
   a second data selection circuit which is coupled between the second bus master, the second data buffer and the write data transfer path and can output any one of write data outputted by the second bus master, write data held in the second data buffer, and data obtained by unifying these write data; and
   a third data selection circuit which is coupled between the first and second data selection circuits and the write data transfer path and can output any one of write data outputted by the first data selection circuit, write data outputted by the second data selection circuit, and write data obtained by unifying these write data.

13. The semiconductor device according to claim 9, wherein the bus transfer device further comprises a data arbiter for arbitrating priority of output to the write data transfer path between a plurality of write data, and wherein if the write data held in the first data buffer has first priority and the write data outputted by the first bus master has second priority, the first data selection circuit can unify and output these write data.

14. The semiconductor device according to claim 8, wherein bits which the first write data and the second write data use on the write data transfer path are determined in accordance with first and second write addresses, respectively, and wherein if the bit used by the first write data does not overlap with the bit used by the second write data, the bus transfer device can unify and transfer the first write data and the second write data.

15. A method of transferring data in a semiconductor device including a plurality of bus masters, a plurality of bus slaves, and a bus transfer device comprising a read data transfer path which can transfer read data having an n-bit width at a maximum, said method comprising:
   during data reading, outputting a read address from a bus master and transferring, along with identification information for identifying a bus master of an output source and identifying a transaction, to a bus slave having the read address, and the bus slave having the read address outputs read data corresponding to the read address, along with the identification information, to the bus transfer device, and
   when the bus transfer device transfers first read data and second read data which have a total data width of n bits or less, the bus transfer device unifies the first read data and the second read data and simultaneously transfers unified read data, first identification information, and second identification information corresponding respectively to the first read data and the second read data through the read data transfer path.

16. The method according to claim 15, wherein the bus slaves comprise a first bus slave which outputs read data having a data width of n/2 bits or less, and wherein the bus transfer device further comprises a first data buffer which is coupled to the first bus slave and holds read data outputted by the first bus slave when the read data transfer path is being used by another bus slave, and a first data selection circuit which is coupled between the first bus slave, the first data buffer and the read data transfer path, the method further comprising:
   the bus transfer device selectively outputting any one of read data outputted by the first bus slave, read data held in the first data buffer, and data obtained by unifying these read data.

17. The method according to claim 16, wherein the bus transfer device further comprises a data distribution circuit coupled between the read data transfer path and the bus masters, the method further comprising:

when the data distribution circuit receives read data obtained by unifying the first read data and the second read data and when a first bus master indicated by the simultaneously transferred first identification information differs from a second bus master indicated by the second identification information, the data distribution circuit inputs the first read data to the first bus master and inputs the second read data to the second bus master.

18. The method according to claim 16, wherein the bus transfer device further comprises a data distribution circuit coupled between the read data transfer path and the bus masters, and a plurality of input data buffers which are provided corresponding respectively to the bus masters and are each coupled between the data distribution circuit and the corresponding bus master, the method further comprising:

when the data distribution circuit receives read data obtained by unifying the first read data and the second read data and when a first bus master indicated by the simultaneously transferred first identification information is identical to a bus master indicated by the second identification information, the data distribution circuit inputs read data first outputted from the first bus slave to the first bus master and inputs read data next outputted from the first bus slave to an input data buffer corresponding to the first bus master.

19. The method according to claim 16, wherein the bus slaves further comprise a second bus slave which outputs read data having a data width of n/2 bits or less, and wherein the bus transfer device further comprises a second data buffer which is coupled to the second bus slave and holds read data outputted by the second bus slave when the read data transfer path is being used by another bus slave, a second data selection circuit which is coupled between the second bus slave, the second data buffer and the read data transfer path and can output any one of read data outputted by the second bus slave, read data held in the second data buffer, and data obtained by unifying these read data, and a third data selection circuit which is coupled between the first and second data selection circuits and the read data transfer path, the method further comprising:

the bus transfer device selectively outputting any one of read data outputted by the first data selection circuit, read data outputted by the second data selection circuit, and read data obtained by unifying these read data.

20. The method according to claim 16, wherein the bus transfer device further comprises a data arbiter for arbitrating priority of output to the read data transfer path between a plurality of read data, the method further comprising:

when the read data held in the first data buffer has first priority and the read data outputted by the first bus slave has second priority, the first data selection circuit selectively unifies and outputs these read data.

21. The method according to claim 15, wherein bits which the first read data and the second read data use on the read data transfer path are determined in accordance with corresponding read addresses, respectively, the method further comprising:

when the bit used by the first read data does not overlap with the bit used by the second read data, unifying and transferring the first read data and the second read data.

* * * * *